US008226508B2

(12) United States Patent
Osborne

(10) Patent No.: US 8,226,508 B2
(45) Date of Patent: Jul. 24, 2012

(54) TRANSMISSIONS, DRIVE SYSTEMS AND METHODS FOR USING SAME

(75) Inventor: Christopher M. Osborne, Efland, NC (US)

(73) Assignee: Honda Motor Co., Ltd., Tokyo (JP)

( * ) Notice: Subject to any disclaimer, the term of this patent is extended or adjusted under 35 U.S.C. 154(b) by 811 days.

(21) Appl. No.: 12/022,664

(22) Filed: Jan. 30, 2008

(65) Prior Publication Data
US 2009/0191992 A1   Jul. 30, 2009

(51) Int. Cl.
*F16H 7/08* (2006.01)

(52) U.S. Cl. ........................................................ 474/101

(58) Field of Classification Search .............. 474/8, 11, 474/12, 17, 37, 46, 61, 62, 63, 101, 113, 474/114
See application file for complete search history.

(56) References Cited

U.S. PATENT DOCUMENTS

| | | | |
|---|---|---|---|
| 2,740,246 A | 4/1956 | Smith et al. | |
| 2,813,433 A | 11/1957 | Adams, Jr. et al. | |
| 4,117,652 A * | 10/1978 | Jones et al. | 56/11.8 |
| 4,381,174 A | 4/1983 | Obler | |
| 4,567,958 A | 2/1986 | Ishihara | |
| 4,846,768 A | 7/1989 | Kitami et al. | |
| 4,907,401 A | 3/1990 | Nemoto et al. | |
| 5,377,774 A | 1/1995 | Lohr | |
| 5,591,100 A | 1/1997 | Hayashi et al. | |
| 5,795,256 A | 8/1998 | Takada | |
| 5,853,347 A | 12/1998 | Aoki et al. | |
| 6,098,385 A | 8/2000 | Turk | |
| 6,406,390 B1 | 6/2002 | Roby | |
| 6,475,109 B2 * | 11/2002 | Blanchard | 474/101 |
| 6,702,059 B2 | 3/2004 | Blanchard | |
| 6,705,961 B2 * | 3/2004 | Johnson et al. | 474/8 |
| 6,755,759 B2 * | 6/2004 | Blanchard | 474/19 |
| 6,945,906 B2 | 9/2005 | Eguchi et al. | |
| 7,029,408 B2 | 4/2006 | Wians | |
| 7,850,555 B2 | 12/2010 | Keane et al. | |
| 2010/0075792 A1 | 3/2010 | Holland | |

OTHER PUBLICATIONS

Catalogue of Clutches and Transmissions for small machines, Popular Science Monthly, Oct. 1961,147-158.

* cited by examiner

*Primary Examiner* — Emmanuel M Marcelo
*Assistant Examiner* — Juan Campos, Jr.
(74) *Attorney, Agent, or Firm* — Jenkins, Wilson, Taylor & Hunt, P.A.

(57) ABSTRACT

Transmissions and drive systems for a self-propelled machine and related methods are provided. An input shaft having an axis and extending transverse to an output shaft is provided. The input shaft can be rotatable about the axis of the input shaft and configured to drivingly engage the output shaft. A variable pitch pulley can be disposed axially on the input shaft and configured to rotate about the axis of the input shaft. The variable pitch pulley can be configured to change pitch diameter to regulate the speed at which the input shaft is rotated. Further, the input shaft can be at least partially rotatable about an axis of the output shaft to vary the pitch of the variable pitch pulley to regulate the speed at which the input shaft drives the output shaft.

28 Claims, 19 Drawing Sheets

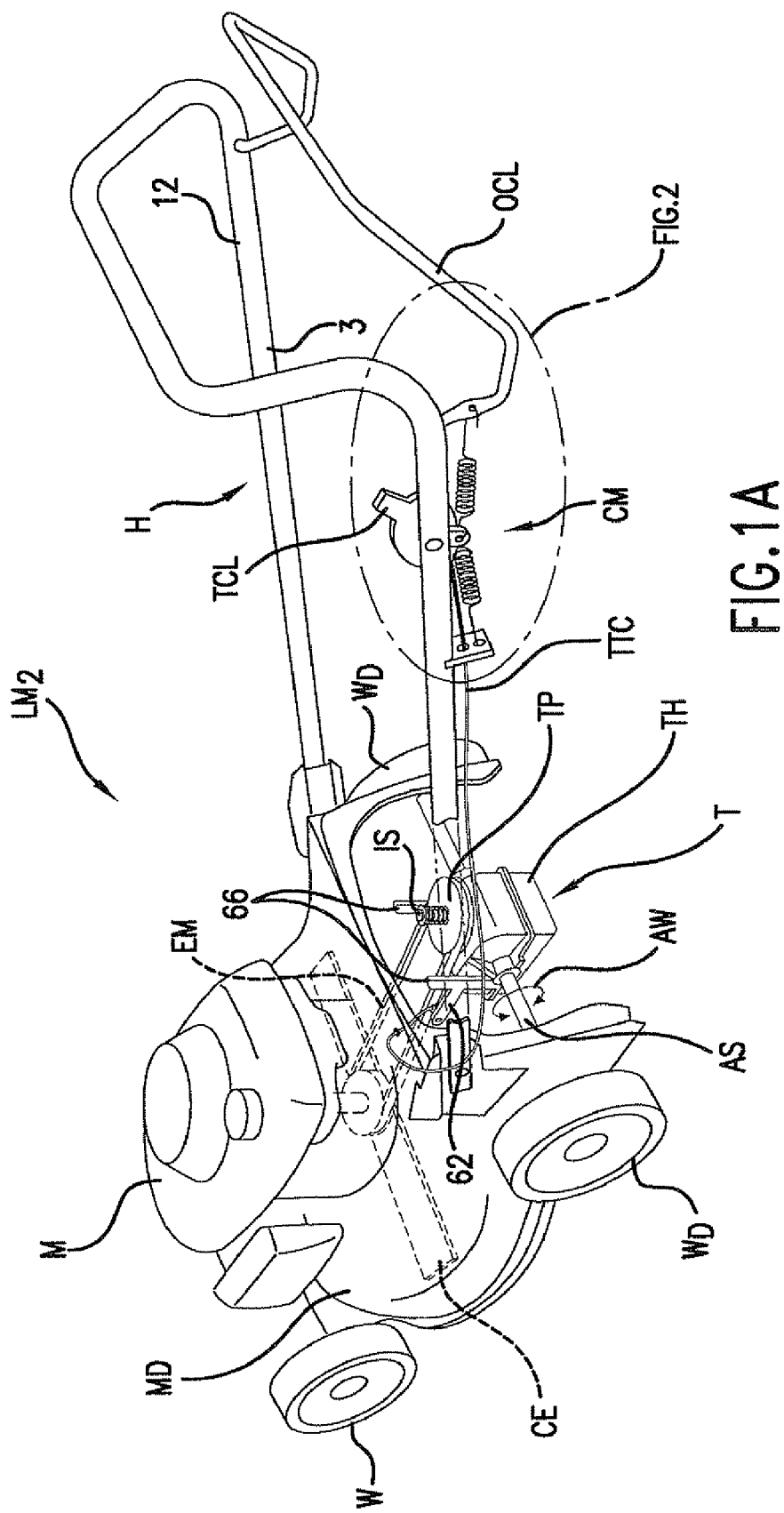

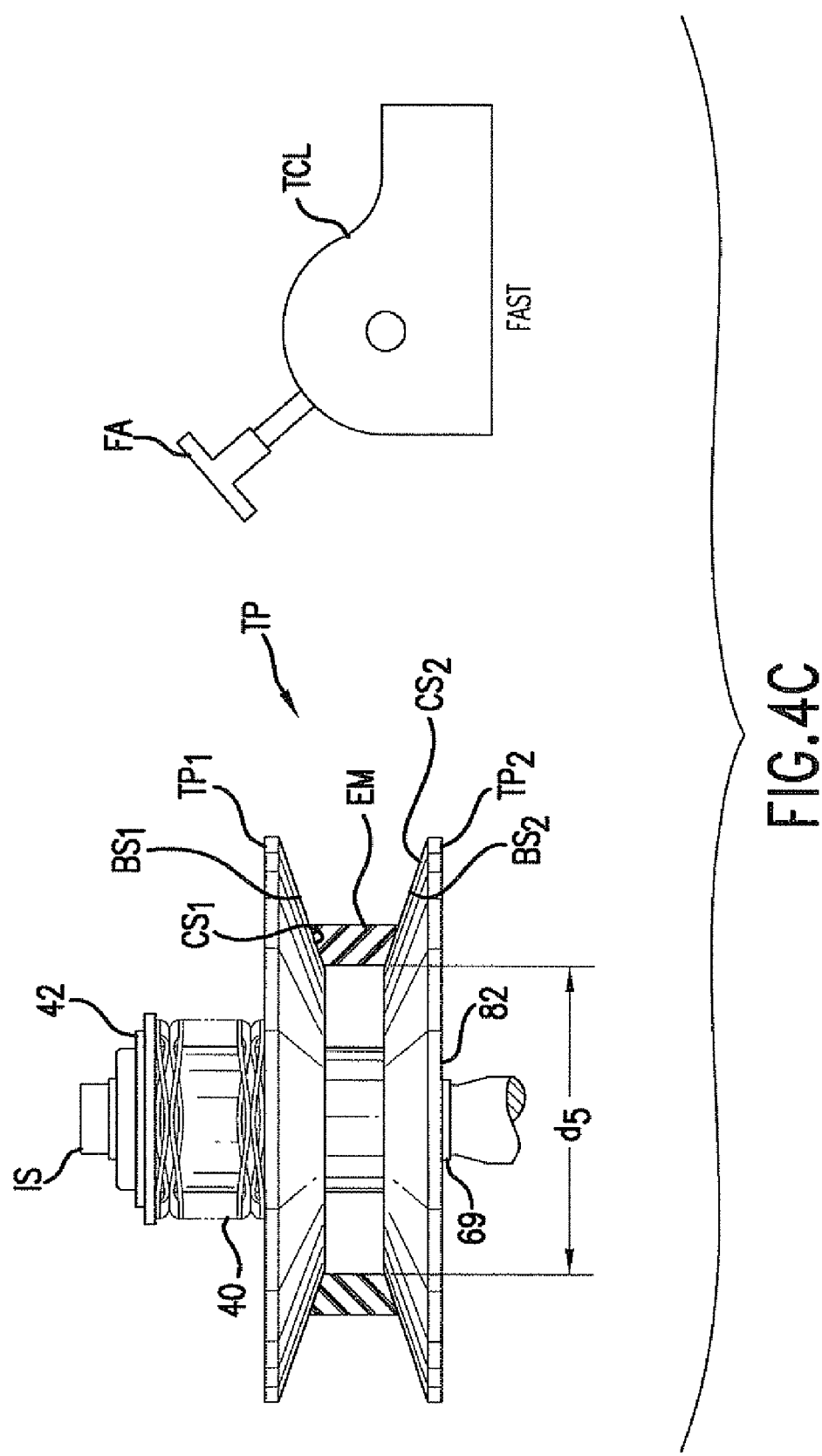

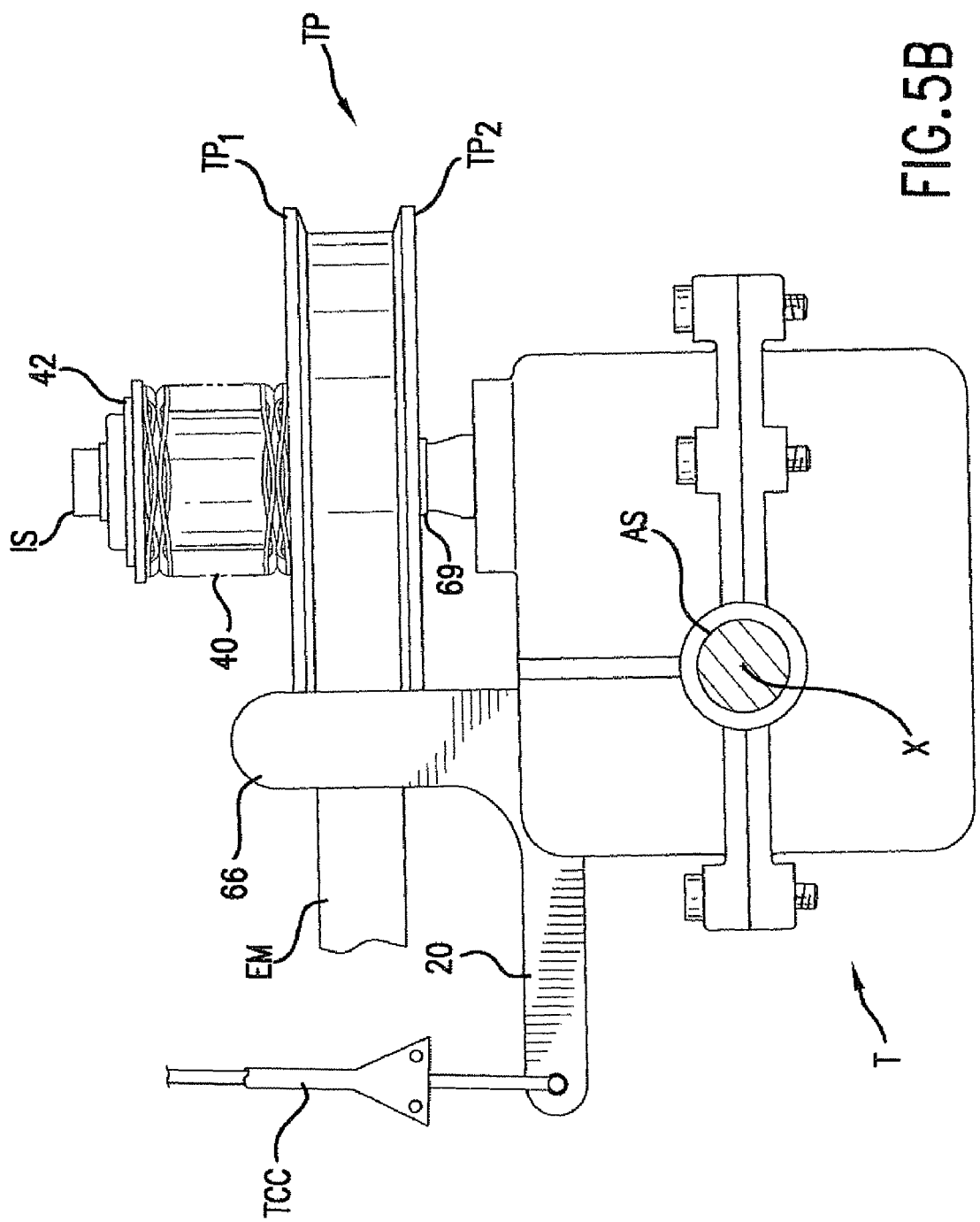

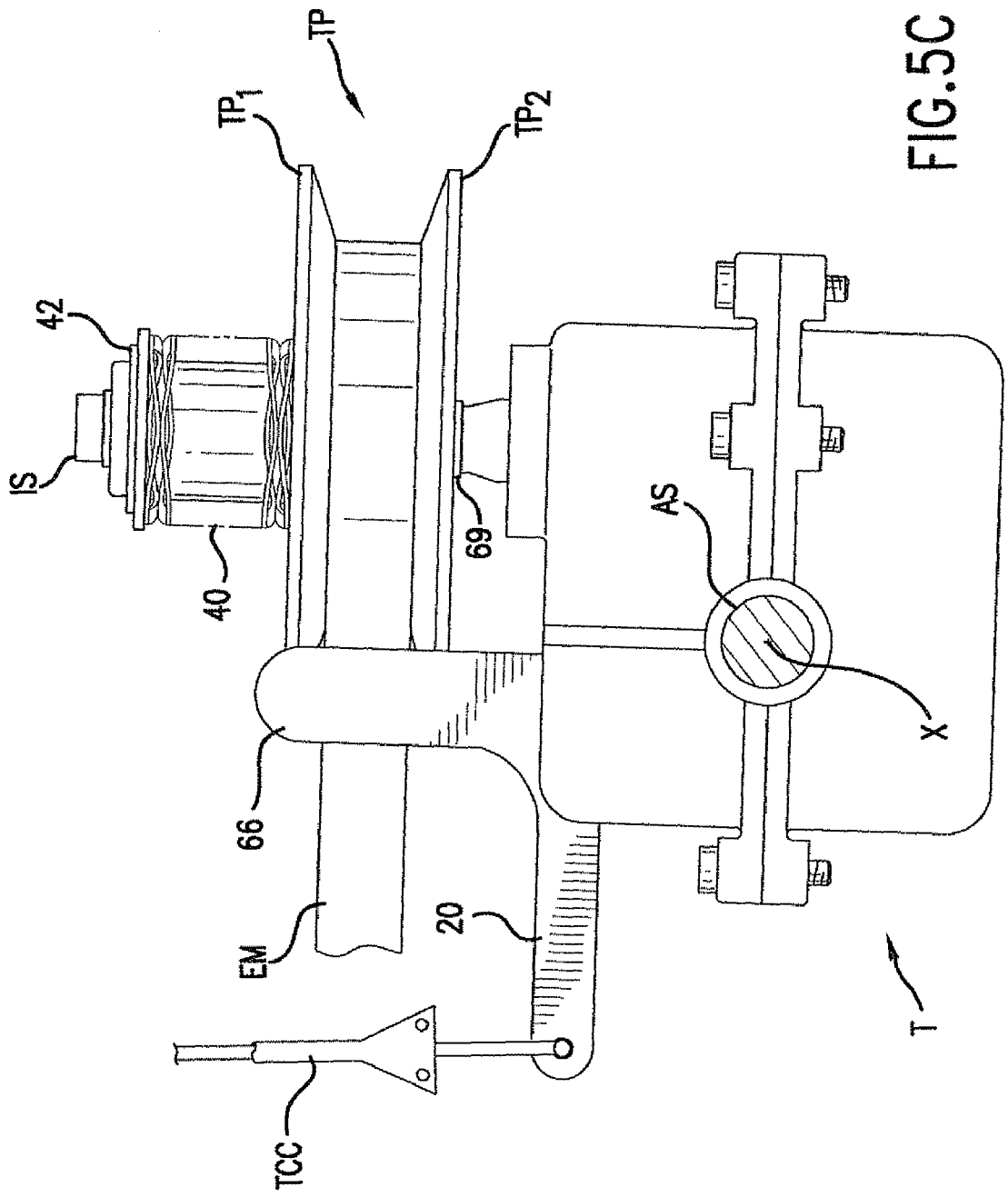

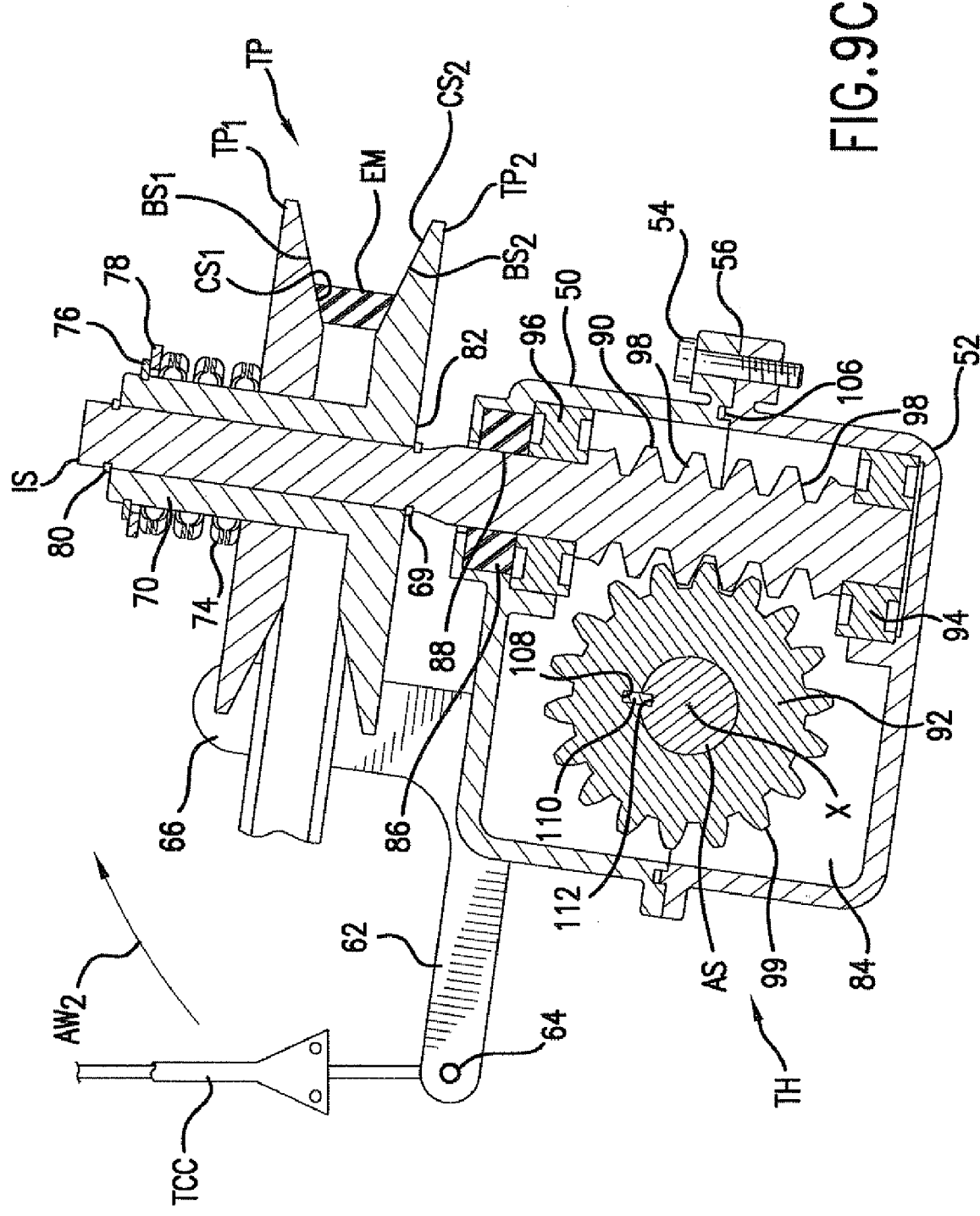

TRANSMISSIONS, DRIVE SYSTEMS AND METHODS FOR USING SAME

TECHNICAL FIELD

The subject matter disclosed herein relates generally to transmissions and drive systems for power equipment vehicles. More particularly, the subject matter disclosed herein relates to variable speed transmissions, drive systems and methods that can utilize tipping variable pitch pulleys that can be used in power equipment including but not limited to mowers, tillers, snow blowers, tractors, and the like.

BACKGROUND

In a single speed self-propelled lawnmower, the engine is generally indirectly coupled to a set of drive wheels to propel the lawnmower at a single speed, which is usually related to the engine speed. Typically, a drive pulley is mounted to an output shaft of the engine and a belt or other transmission mechanism connects the drive pulley to a drive shaft which in turn rotates the drive wheels. When the drive system is engaged, the lawnmower automatically assumes the single speed. When the drive system is disengaged, the lawnmower stops.

If any variable speed control exists, it is typically accomplished by changing the engine speed. Unfortunately, this can be disadvantageous in situations where the operator might prefer a higher engine speed and a lower lawnmower speed, such as when cutting tall grass. If the engine speed is increased to provide for increased speed of the cutting elements and better cutting, the lawnmower moves faster and thereby negates the benefit of the increased speed of the cutting elements. Moreover, for some people, the single speed may be too fast or too slow and, therefore, an uncomfortable speed for walking behind a lawnmower. A variable speed mechanism that would allow the operator to adjust the speed of the lawnmower to suit the individual needs of the operator and separately control engine speed would be an improvement over conventional single speed drive systems.

In variable speed, self-propelled lawnmowers, two separate mechanisms are generally used to operate the lawnmower. An engagement mechanism is actuated to engage the drive system to begin propelling the lawnmower and a separate speed control mechanism is utilized to adjust the speed of the lawnmower. Moreover, conventional variable speed drive systems utilize complex and costly multiple gear sets or friction drive wheels and a clutch. A variable speed drive system that eliminates the complex and costly mechanisms yet uses a single mechanism to set the desired speed and to engage the drive system would provide a substantial improvement over conventional drive systems in the form of reduced manufacturing costs and maintenance requirements.

Variable speed drive systems have been developed in an attempt to provide variable speed to the drive of a self propelled machine without changing the speed of the engine. For example, a variable speed drive system has been developed for use with a lawnmower having an engine mounted to a frame and a pair of drive wheels coupled to an axle shaft for propelling the lawnmower. The system includes a variable pitch pulley attached to a pulley shaft that is in parallel with the axle shaft of the pair of drive wheels. The variable pitch pulley is coupled by a belt to a drive pulley mounted on an output shaft of the engine that is separate and distinct from the drive shaft operated by the engine to rotate the blade of the lawnmower. The output shaft on which the drive pulley is attached is also in parallel with the axle shaft. The variable pitch pulley is coupled to the axle shaft by a chain housing fixture that includes a chain and a sprocket. The fixture positions the variable pulley in spaced-apart relation to the axle shaft, and moves about the drive shaft between an engaged position and a disengaged position.

Such a variable drive system requires either two separate engines, one to drive the blade of the lawnmower and one to drive the output shaft for drive the wheels, or a complicated drive system that converts the rotation of the drive shaft of the blade to a rotation that is perpendicular thereto to rotate the output shaft. Further, this drive system occupies precious space on the lawnmower deck.

Therefore, in light of the above, a need exists for transmissions, drive systems and related methods that allow for easier control of propulsion of a self-propelled machine while reducing the complexity of the drive system and conserving space on the machine.

SUMMARY

In accordance with this disclosure, variable speed transmissions, drive systems, and methods are provided. It is, therefore, an object of the present disclosure to provide variable speed transmissions, drive systems and methods that utilize tipping variable pitch pulleys that can be used in power equipment including but not limited to mowers, tillers, snow blowers, and tractors. This, and other objects as may become apparent from the present disclosure, is achieved, at least in whole or in part, by the subject matter described herein.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIG. 1A illustrates a perspective view of another embodiment of a self-propelled machine having a variable speed transmission in accordance with the present subject matter wherein the transmission can be manually actuated;

FIGS. 4A-4C illustrate schematic views of an embodiment of a variable pitch pulley when a control mechanism is in different positions according to the present subject matter;

FIGS. 5A-5C illustrate schematic views of an embodiment of a transmission in different positions when rotated about an axle shaft by a control mechanism according to the present subject matter;

FIGS. 9A-9C illustrate vertical cross-sectional views of the portion of the transmission of FIG. 6A perpendicular to the axis of the axle shaft.

DETAILED DESCRIPTION

Reference will now be made in detail to presently preferred embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Figure 1:
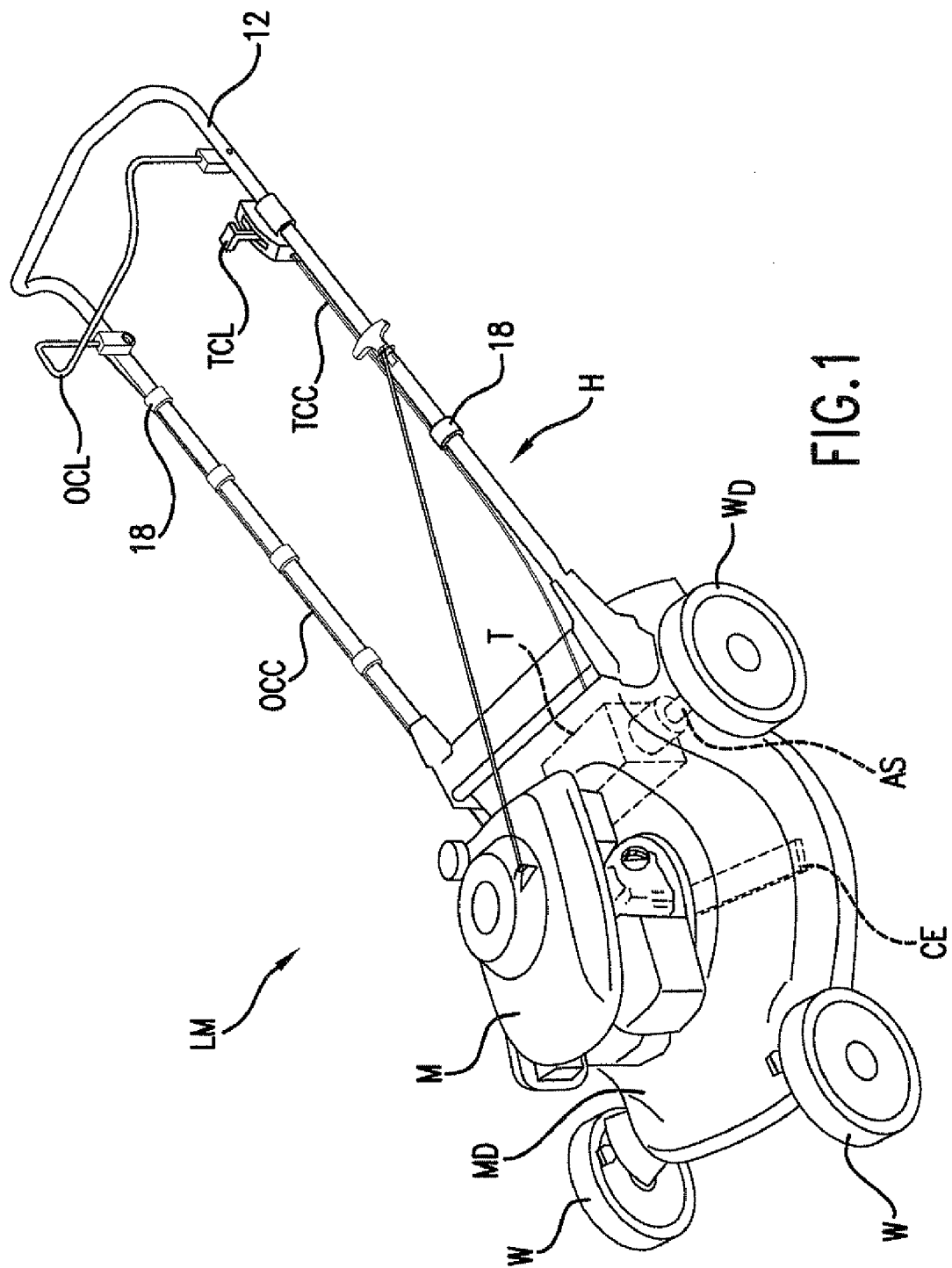
FIG. 1 illustrates a perspective view of an embodiment of a self-propelled machine having a variable speed transmission in accordance with the present subject matter.

Referring now to FIG. 1, a self-propelled machine, for example, a self-propelled lawnmower, generally designated LM, is provided. The embodiments disclosed herein are not limited to lawnmowers or to any particular type of lawnmower such as a riding mower or a walk-behind mower. The embodiments can apply to any self-propelled machines, whether the riding or walk-behind type, such as snow blowers, leaf blowers, yard vacuums, tillers, edgers, seeders, trimmers, aerators, fertilizers, palette trucks, graders, vehicles for transportation, pavement and construction machines, and the like. Moreover, the embodiments can be utilized in conjunction with any non-mobile machine or tool that includes a rotating component requiring speed adjustment and an ON/OFF capability.

Continuing with the example provided in FIG. 1, lawnmower LM can comprise any suitable configuration generally known to persons skilled in the art or later developed. In the exemplary embodiment, lawnmower LM can include a frame such as a mower deck MD. A handle, generally designated H, can be coupled to mower deck MD by any suitable means, and extend upwardly therefrom at an angle appropriate for comfortable grasping and manipulation by an operator. Mower deck MD can be supported for rolling movement over a surface by a set of wheels, including one or more idle (non-driving) wheels W and one or more driving wheels $W_D$. The embodiment is not limited to which one or more of wheels W functions as driving wheel or wheels $W_D$, although typically the rearmost wheel or wheels serve this function.

Lawnmower LM also includes a powered drive system or assembly that includes a suitable motor M, such as an electric motor or an internal combustion engine, and a transmission, generally designated T. Both motor M and transmission T can be mounted to lawnmower LM in a suitable manner. Motor M rotates an accessory that can be a suitable cutting element CE, such as a blade or blades, that can be disposed within an interior of mower deck MD. Motor M can transfer power to driving wheel(s) $W_D$ through transmission T that rotates an output shaft in the form of axle shaft AS. Thereby, lawnmower LM is rendered self-propelled in response to control by the operator.

Lawnmower LM can include an operational control lever OCL and a transmission control lever TCL, both of which are preferably mounted to handle H. Operational control lever OCL and transmission control lever TCL can be disposed at or near a proximal end section 12 of handle H to facilitate manipulation by an operator. Operational control lever OCL can communicate with motor M and/or transmission T through a suitable linking member such as an operational control cable OCC. Transmission control lever TCL can communicate with transmission T through a suitable linking member such as a transmission control cable TCC. As appreciated by persons skilled in the art, operational control cable OCC and transmission control cable TCC can be any suitable elongate components that are rigid enough to be capable of transferring a force or actuation by translation and/or a change in tension to the transmission. A non-limiting example is a cable, such as a Bowden wire, at least a portion of which can typically be encased and extended through a coaxial sheath. To maintain a general position of operational control cable OCC and/or transmission control cable TCC relative to lawnmower LM, operational control cable OCC and/or transmission control cable TCC can be retained at one or more locations on lawnmower LM by one or more retaining members such as retaining members 18 shown in FIG. 1.

Operational control lever OCL implements an operator presence or deadman control through the interaction of operational control lever OCL and engine M and/or transmission T via operational control cable OCC. Thus, operational control cable OCC is intercoupled between operational control lever OCL and an appropriate machine control component (not specifically shown) of drive system DS by any suitable means. The machine control component can be, for example, a kill switch of engine M that disconnects engine M from an ignition component (in the case of an internal combustion engine) or a battery or source of line voltage (in the case of an electric motor), a throttle of engine M, and/or a clutch, flywheel brake or similar device that controls the transfer of power from engine M to cutting element CE, transmission T and/or driving wheel(s) $W_D$. The pivoting or rotation of operational control lever OCL relative to handle H actuates operational control cable OCC and, in turn, the machine control component to implement the operator presence control.

As appreciated by persons skilled in the art, the operator presence control in general is a safety feature that is typically movable between two states, ON and OFF, and typically is biased toward its OFF state. When the operator is operating or manipulating lawnmower LM in an intended manner, such as by properly gripping both handle H and operational control lever OCL, the operator presence control is in the ON position. The ON position permits the engine M to be activated and/or cutting element CE to be driven, and lawnmower LM to be propelled using the power generated by engine M and transferred by transmission T. When, on the other hand, the operator is not operating or manipulating lawnmower LM in an intended manner, such as by releasing or failing to grip operational control lever OCL, the operator presence control is in the OFF position. The OFF position disables engine M, cutting element CE, and/or transmission T.

The embodiments described in more detail below provide an apparatus for controlling transmission T. This apparatus is structured to combine both clutch control and speed control. Thus, only a single transmission control lever TCL, with a single transmission control cable TCC associated therewith, is required in the embodiments disclosed herein. Accordingly, transmission control cable TCC is intercoupled between transmission control lever TCL and transmission T. The embodiments disclosed herein are not limited to any form of transmission control lever TCL or the manner of its operation. Transmission control lever TCL can be a lever mounted on one side of handle H as illustrated in FIG. 1, a U-shaped lever that pivots relative to handle H in a manner analogous to operational control lever OCL, the whole or a portion of handle H itself that pivots relative to mower deck MD, or a portion of handle H that slides or otherwise linearly translates relative to the remaining portion of handle H.

Referring to FIG. 1A, a lawnmower $LM_2$, similar to the lawnmower LM of FIG. 1, is shown. FIG. 1A illustrates a cutaway of mower deck MD, thereby exposing an output shaft in the form of an axle shaft AS along with an embodiment of a transmission T. Driving wheels $W_D$ can be attached to ends of axle shaft AS. Driving wheels $W_D$ can, however, be rotatably attached to mower deck MD and driven by axle shaft AS through reduction gearing (not shown).

Transmission T can include a variable pitch pulley TP that is controlled by a control mechanism, generally designated by CM, that can comprise a single transmission control cable TCC, transmission control lever TCL and operation control lever OCL. Variable pitch pulley TP can be disposed axially on an input shaft IS can be in the form of a pulley shaft. Input shaft IS can extend transverse to axle shaft AS and engage axle shaft AS in transmission housing TH. An endless member EM, such as a belt or chain can engage variable pitch pulley TP and a pulley on a drive shaft of motor M used to drive cutting element CE. Under tension, endless member EM can be driven by the drive shaft as motor M turns the drive shaft. In turn, endless member EM can turn variable pitch pulley TP and, thus, pulley shaft IS. As pulley shaft IS turns, the engagement of the input shaft IS to axle shaft AS converts the transverse rotation of input shaft IS to a rotation of axle shaft AS.

To adjust tension in the endless member EM, input shaft IS and transmission housing TH can be rotatable about axle shaft AS in the direction of arrows AW. As input shaft IS is rotated about axles shaft AS toward motor M, endless member EM loosens and the pitch diameter of variable pitch pulley TP increases to decrease the speed of rotation of the input shaft IS and thus the axle shaft AS. As input shaft IS is rotated about axle shaft AS away from motor M, endless member EM tightens and the pitch diameter of variable pitch pulley TP decreases to increase the speed of rotation of the input shaft IS and thus the axle shaft AS. The rotation of the input shaft IS and transmission housing TH about axle shaft AS can be controlled by transmission control cable TCC and transmission control lever TCL.

To permit operation of the transmission control lever TCL, an operational control lever OCL, which can operate as an operator presence control and can be located on the underside of proximal end section 12 of the handle H, should be pulled toward the handle H to align a control arm on the transmission control lever TCL. Transmission control lever TCL can then be moved between a slow and fast speed or any intermediate speed therebetween. Transmission control lever TCL can also move input shaft IS to a disengaged position where endless member EM lacks enough tension to rotate variable pitch pulley TP and input shaft IS. Transmission control lever TCL is connected to transmission T by transmission control cable TCC through transmission control cable TCC. Transmission control cable TCC is secured to pivot arm 20. By moving the transmission control lever TCL between different speed settings, the transmission control cable TCC rotates input shaft IS and transmission housing TH about an axle shaft AS of the lawnmower $LM_2$.

Figure 2:
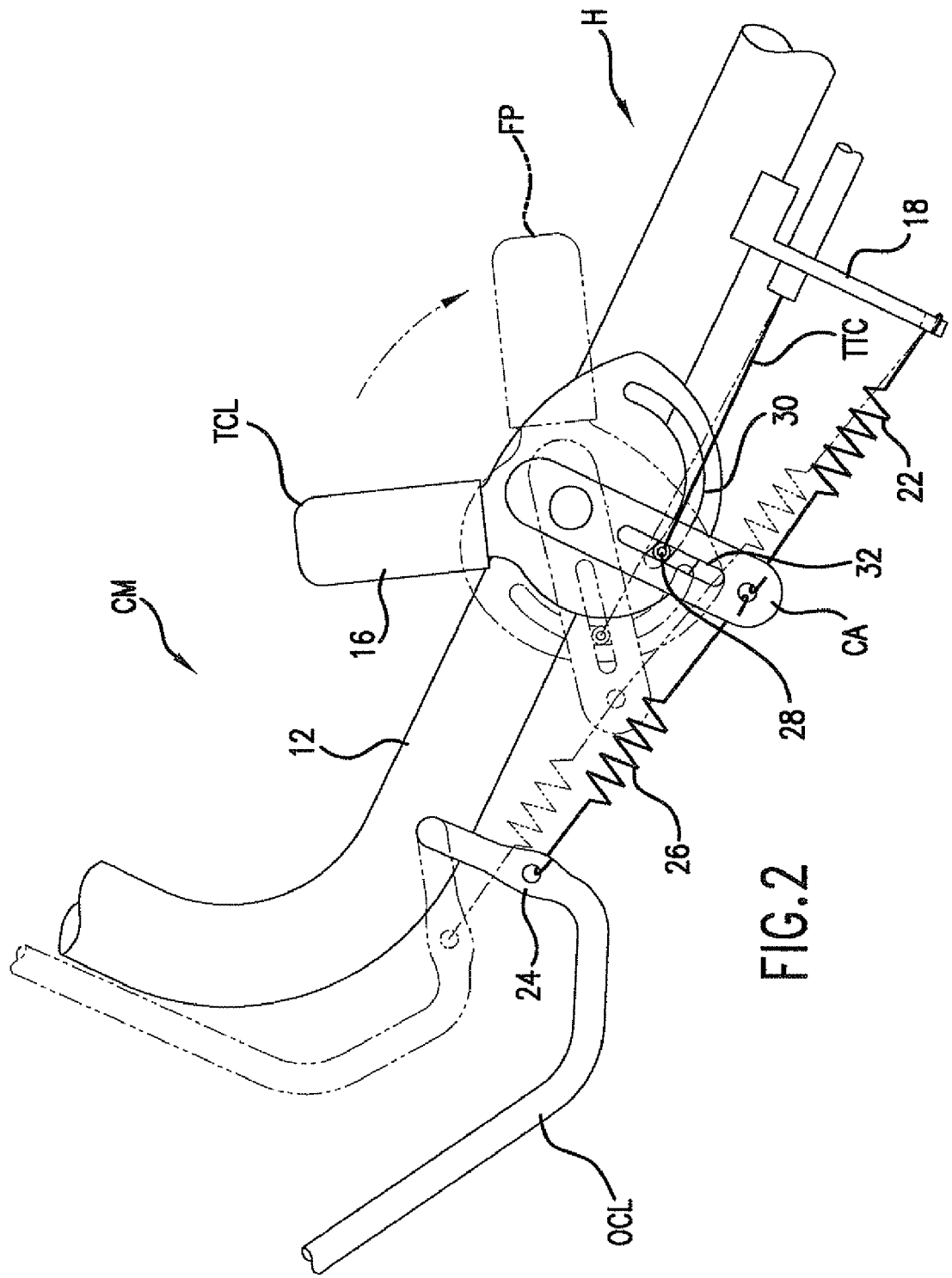
FIG. 2 illustrates an enlarged view of the encircled area 2 of FIG. 1A showing an embodiment of a control mechanism for use with a variable speed transmission according to the present subject matter.

FIG. 2 shows an enlarged view of the portion of the control mechanism CM shown in the encircled area 2 of FIG. 1A. In the embodiment shown, transmission control lever, generally designated as TCL, can be secured to proximal end section 12 of handle H proximate to operational control lever OCL. Transmission control lever TCL of control mechanism CM can include a control arm CA and lever 16. Control arm CA can be movably secured to a retaining member 18 positioned on handle H on the side of transmission control lever TCL opposite operational control lever OCL by a return spring 22. Control arm CA can also be movably secured in the opposite direction to a spring arm 24 of operational control lever OCL by an alignment spring 26. A pin 28 attached to the exposed end of transmission control cable TCC can reside in guide slots 30 and 32 in lever 16 and control arm CA, respectively. As pin 28 moves within guide slots 30, 32 with the movement of lever 16 and control arm CA, transmission control cable TCC rotates transmission T (see FIG. 1A). In the embodiment shown in FIG. 2, transmission control lever TCL is in a position representing disengagement of transmission T. Transmission control lever TCL is shown in a position FP in dashed lines. In position FP, transmission control lever TCL through transmission control cable TCC rotates transmission T to create a higher axle shaft speed.

When operational control lever OCL is released and in it resting position, return spring 22 biases control arm CA toward retainer member 18. Such an alignment of control arm CA can aid in moving and keeping input shaft IS of transmission T in a disengaged position through transmission control cable TCC. When operational control lever OCL is pulled toward and held against handle H, alignment spring 26 pulls control arm CA away from retainer member 18. Such an alignment of control arm CA can create a greater range of movement of transmission control cable TCC with transmission control lever TCL permitting a greater range of rotation of transmission T about axle shaft AS. Transmission control lever TCL and control arm CA can be configured to provide more stroke in the fast position by changing the guide slot to a different, larger radius. When the operational control lever OCL is released transmission control cable TCC can rotate transmission housing TH, input shaft IS and variable pitch pulley TP further towards the drive pulley such that endless member EM is effectively disengaged from variable pitch pulley TP and endless member EM does not rotate variable pitch pulley TP. Return spring 22 and control spring 26 prevent over travel of control arm CA.

Figure 3A:
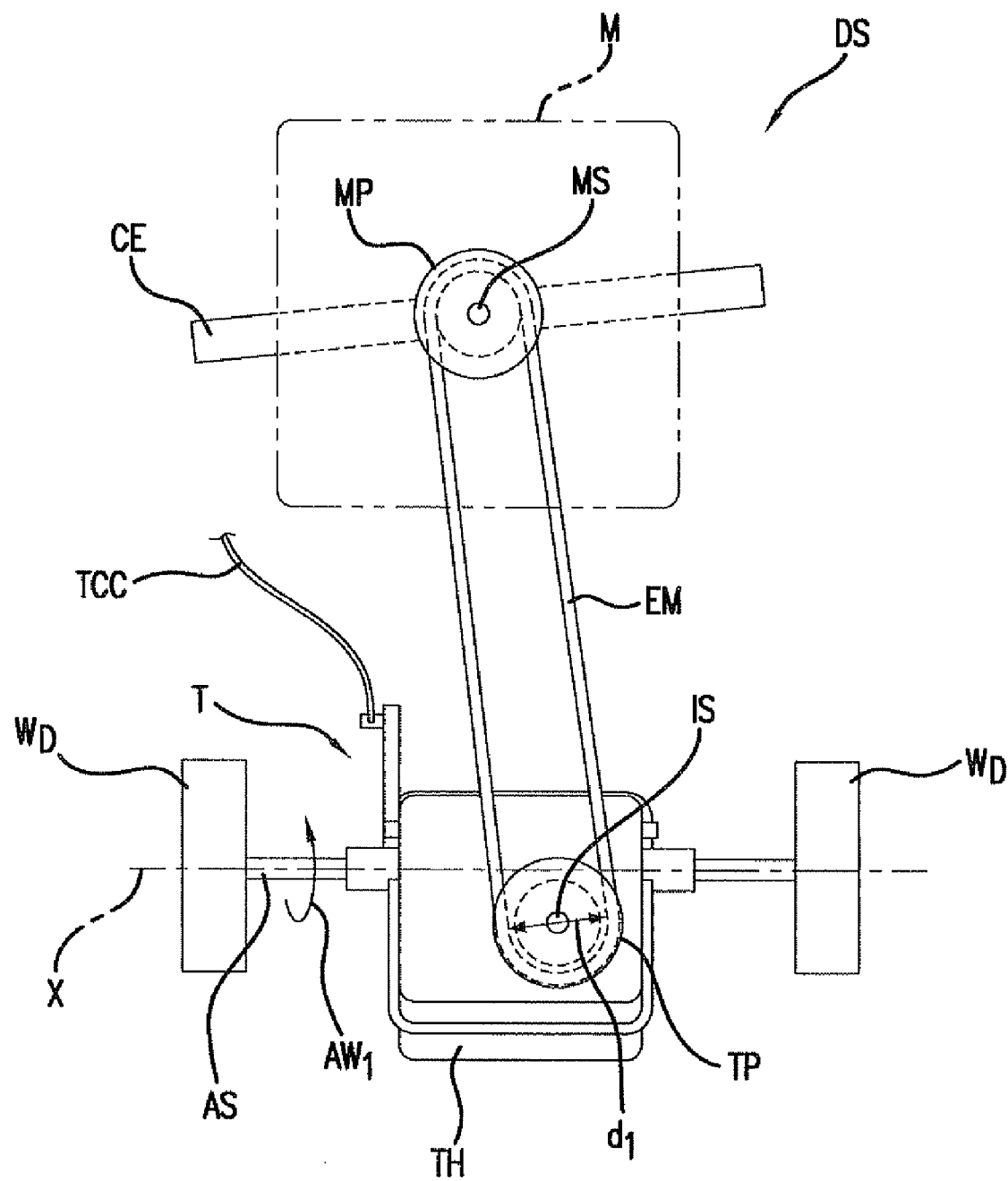
FIG. 3A illustrates a schematic view of an embodiment of a drive system with the pulley housing rotated about the axle shaft toward the drive shaft provided within the self-propelled machine of FIG. 1.
Figure 3B:
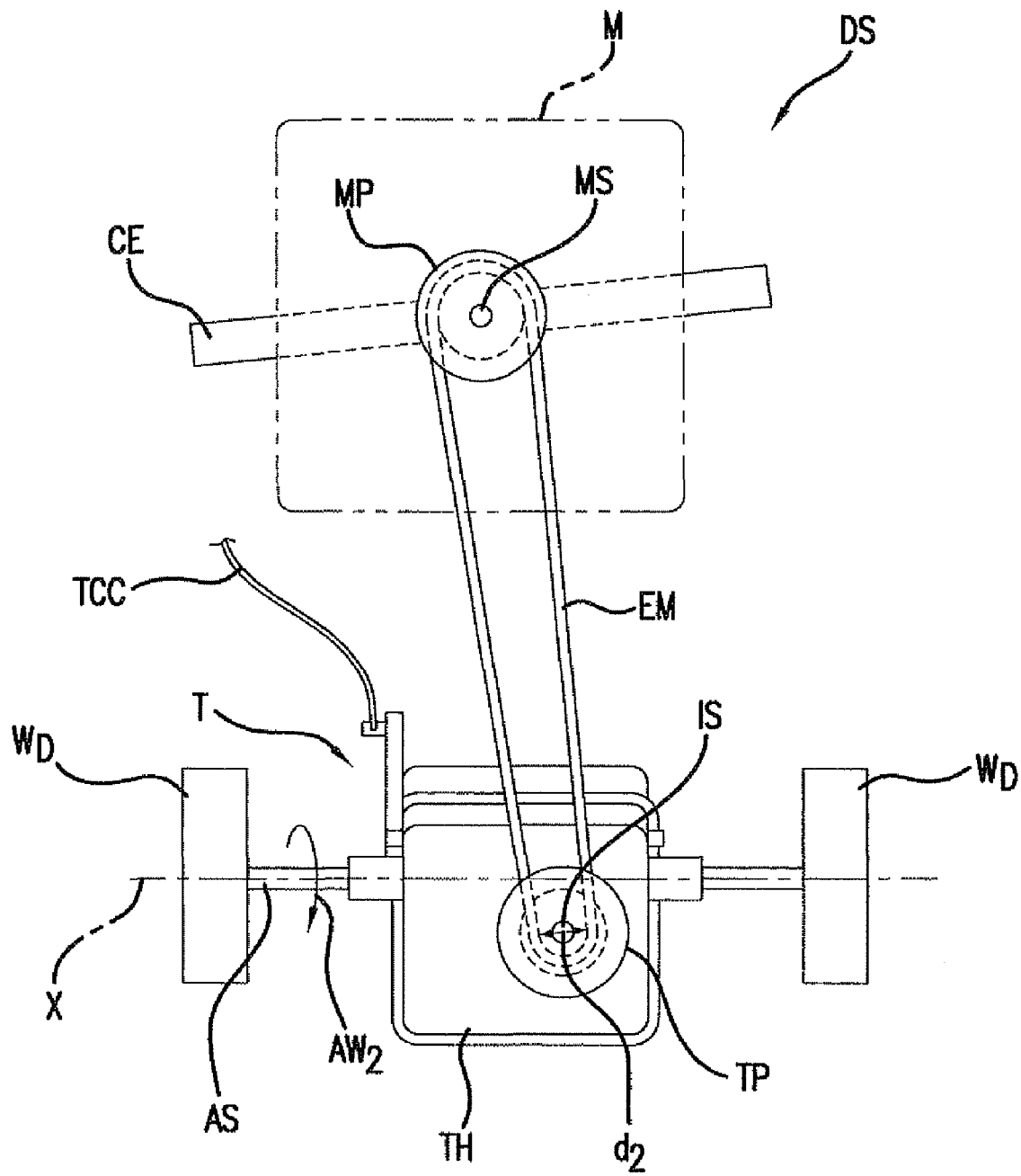
FIG. 3B illustrates a schematic view of an embodiment of a drive system with the pulley housing rotated about the axle shaft away from the drive shaft provided within the self-propelled machine of FIG. 1.

The drive system and associated components are schematically illustrated in FIGS. 3A and 3B, and generally designated as DS. A drive shaft MS of motor M can rotate a suitable cutting element CE such as a blade or blades disposed within an interior of a mower deck. Motor M also can transfer power to driving wheel(s) $W_D$ through transmission T, thereby rendering lawnmower LM self-propelled in response to control by the operator. For this purpose, motor M can be coupled to transmission T through a variable (i.e., adjustable) torque transfer mechanism. In the example illustrated in FIGS. 3A and 3B, the torque transfer mechanism can comprise an endless member EM such as a belt that can be carried at one end by a drive pulley MP and at the other end by a variable pitch transmission pulley TP. Input shaft IS and variable pitch pulley TP can be aligned with drive shaft MS and drive pulley MP of motor M of the lawnmower. In this manner, endless member EM can be run directly between variable pitch pulley TP and drive pulley MP secured on drive shaft MS driven by motor M. Thus, a separate drive system is not needed to drive the rear wheels of the lawnmower. Drive pulley MP can be rotated by drive shaft MS, and variable pitch pulley TP can rotate input shaft IS of transmission T. Thus, torque from drive shaft MS can be transferred to input shaft IS via endless member EM. The amount of torque and the speed at which the input shaft IS rotates can be varied by rotation of transmission T about an axis X of axle shaft AS. Torque from input shaft IS can be transferred to axle shaft AS coupled to driving wheel(s) $W_D$ through an appropriate rotatable internal transmission assembly, one non-limiting example of which is described below. In some embodiments, axle shaft AS can comprise a pair of axles or half-shafts coupled to respective driving wheel(s) $W_D$.

FIG. 3A shows transmission T in a position in which wheels $W_D$ can be rotated at a slower speed. Through actuation of transmission control cable TCC, transmission housing TH and input shaft IS has been rotated in a direction $AW_1$ toward motor M. The rotation in direction $AW_1$ is centered about axis X that passes through the center of axle shaft AS. The rotation of transmission housing TH and input shaft IS in direction $AW_1$ moves variable-pitch pulley TP closer to drive pulley MP. This movement of the variable pitch pulley TP thereby loosens the tension in endless member EM. The reduction of tension in endless member EM permits variable pitch pulley TP to increase its effective pitch diameter to a large effective pitch diameter $d_1$. An example of a variable pitch pulley and the process of changing its pitch diameter will be described further below. The tension in endless member EM, however, still creates enough friction to drive input shaft IS and axles shaft AS.

FIG. 3B shows transmission T in a position in which wheels $W_D$ will be rotated at a faster speed. Through actuation of transmission control cable TCC, transmission housing TH and input shaft IS has been rotated about axis X of axle shaft AS in a direction $AW_1$ away from motor M moving variable pitch pulley TP farther from drive shaft M and drive pulley MP. This movement of the variable pitch pulley TP thereby tightens the tension in endless member EM. The increase in tension in endless member EM permits variable pitch pulley TP to decrease its effective pitch diameter to a smaller effective pitch diameter $d_2$ as compared to effective pitch diameter $d_1$ and creates friction to drive input shaft IS and axles shaft AS. Since the pitch diameter of drive pulley MP and the revolutions of the motor M stay constant, endless member EM continues to rotate at the same speed. Thus, the decrease of effective pitch diameter from pitch diameter $d_1$ to pitch diameter $d_2$ decreases the effective circumference of variable pitch pulley TP that engages endless member EM, thus resulting in an increase of revolutions of the input shaft IS. Thus, the increased rotation of input shaft IS increases the rotation of the axle shaft AS.

Figure 4A:
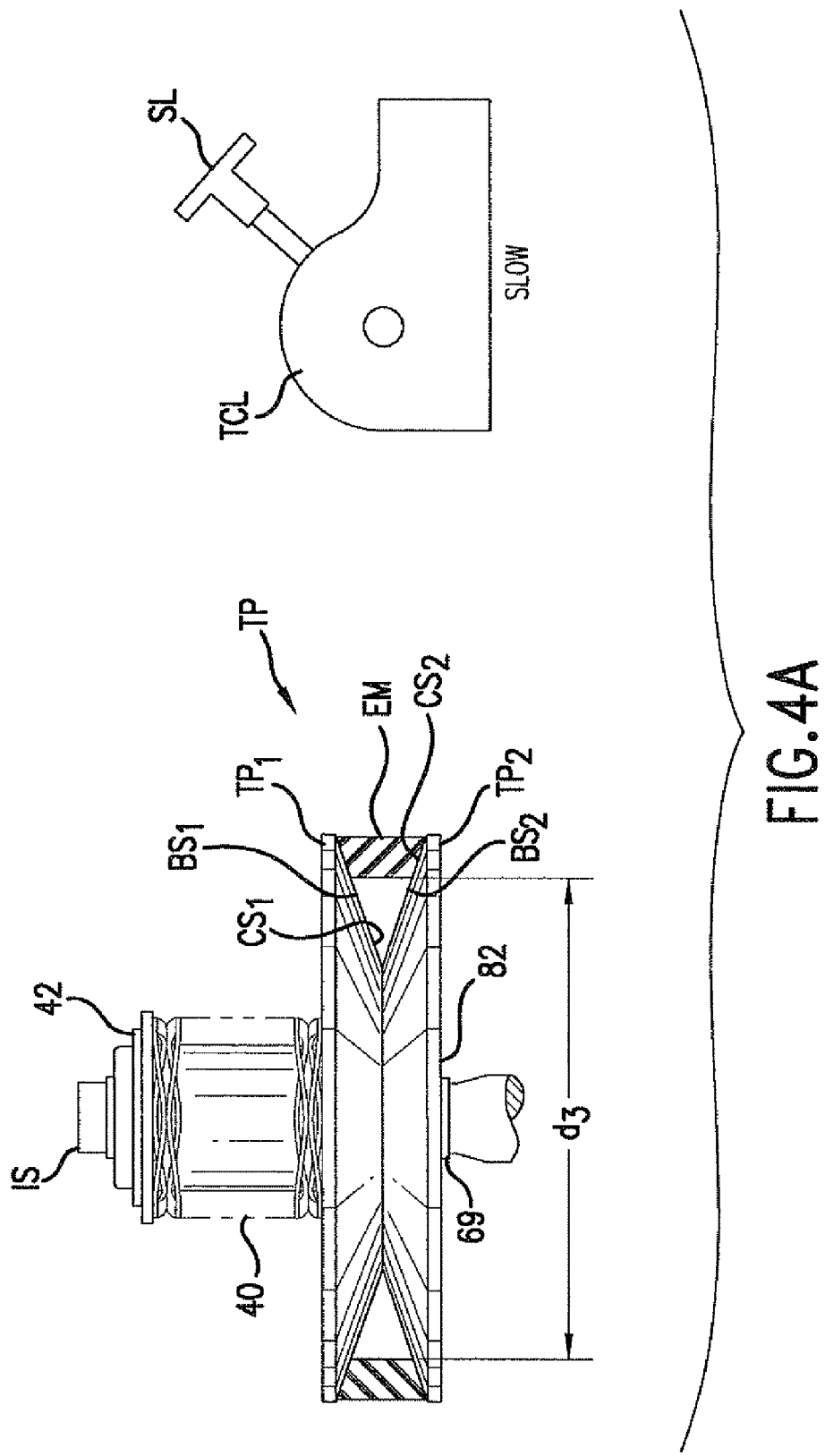
Figure 4B:
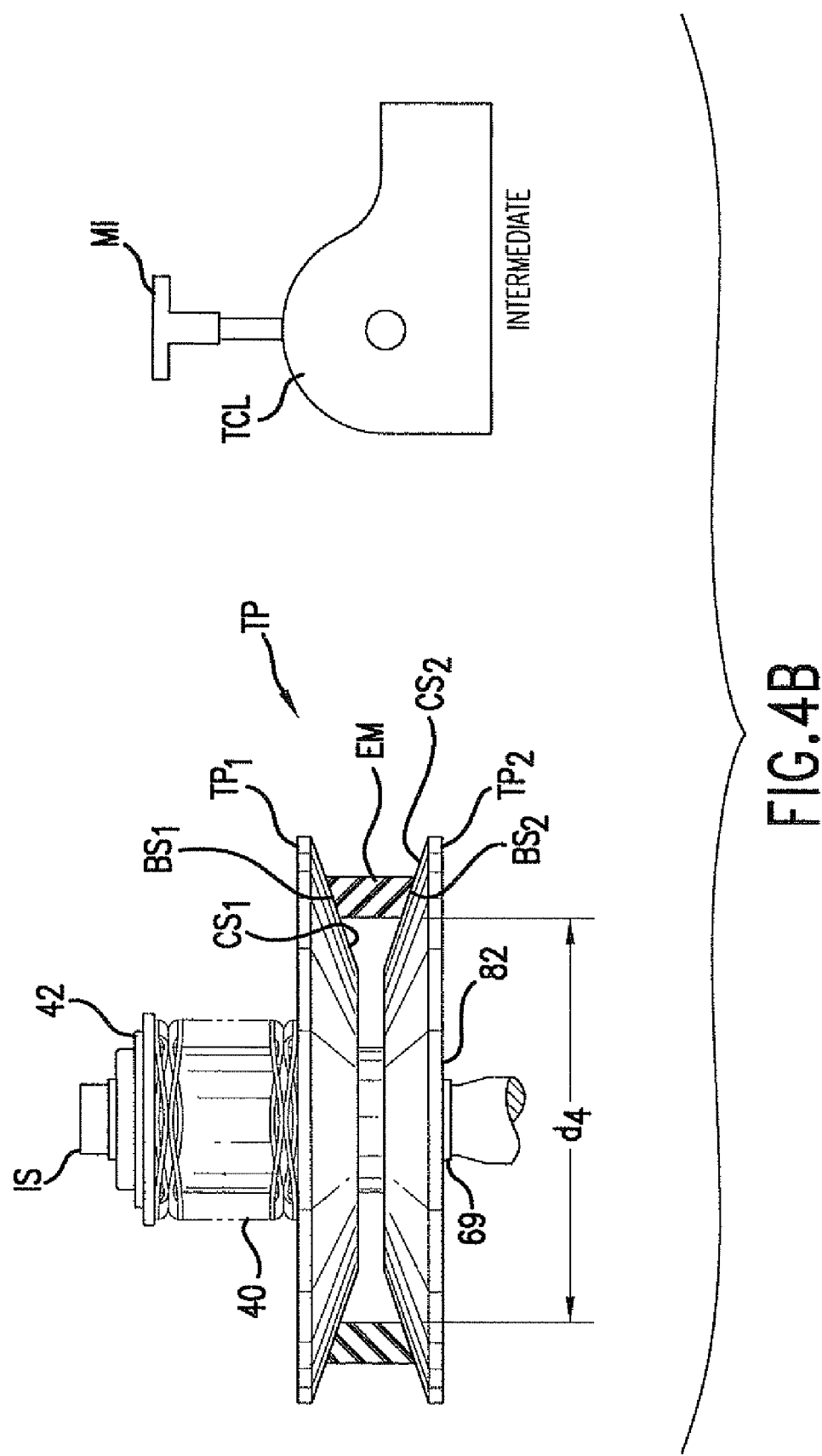

FIGS. 4A-4C illustrate the operation of variable pitch pulley TP under tension in endless member EM caused by the rotation of the transmission at different points. Variable pitch pulley TP can comprise two flanges or halves, illustrated as a first pulley member $TP_1$ and a second pulley member $TP_2$. To enable the pitch or distance between first and second pulley members $TP_1$ and $TP_2$ to be varied, at least one of first and second pulley members $TP_1$ and $TP_2$ can be axially translatable along input shaft IS relative to the other. In the present embodiment, first pulley member $TP_1$ can be axially movable and second pulley member $TP_2$ can be axially stationary. First pulley member $TP_1$ can be mechanically referenced to input shaft IS by any suitable means to permit first pulley member $TP_1$ to transmit rotational force to input shaft IS while, at the same time, enabling the axial adjustment of first pulley member $TP_1$ relative to second pulley member $TP_2$. For instance, first pulley member $TP_1$ can be mated with input shaft IS by means of splines (not shown). For example, first pulley member $TP_1$ can include a splined pulley hub (not shown) that can slidingly engage complementary splines (not shown) on a central portion of second pulley member $TP_2$. Second pulley member $TP_2$ can be secured to input shaft IS by any suitable means, such as a set screw and threaded bore or a key and keyway.

By the configuration just described, the pitch diameter of variable pitch pulley TP can be adjusted to vary the radius of rotation of endless member EM carried thereby. For instance, by rotating input shaft IS away from the motor, endless member EM can cause the distance between first and second pulley members $TP_1$ and $TP_2$ to increase thereby making frictional contact with first and second pulley members $TP_1$ and $TP_2$ at a location radially closer to input shaft IS which is rotated by variable pitch pulley TP. By rotating the input shaft towards the motor, a bias element 40 in the form of a spring biasing first pulley member $TP_1$ and the reduction in tension of endless member EM can cause the distance between first and second pulley members $TP_1$ and $TP_2$ to decrease. Thus, first and second pulley members $TP_1$ and $TP_2$ make frictional contact with endless member EM at a location radially farther from input shaft IS which is rotated by variable pitch pulley TP.

Assuming a given frequency $\omega$ at which endless member EM is rotating under the driving force of motor M, the reduction in the radius r at which endless member EM turns relative to input shaft IS results in an increased angular velocity $\alpha$ at which input shaft IS is driven by endless member EM, according to the relation $\alpha=\omega/r$. As shown in FIGS. 4A-4C, contact surfaces $BS_1$ and $BS_2$ of endless member EM and respective contact surfaces $CS_1$ and $CS_2$ of first and second pulley members $TP_1$ and $TP_2$ can be complementarily tapered to facilitate movement of endless member EM toward and away from input shaft IS.

The pitch diameters of variable pitch pulley TP in relation to positions of the transmission control lever TCL and the speed of rotation of the axle shaft AS are shown in FIGS. 4A-4C. FIG. 4A shows transmission control lever TCL set in a slow position SL. The transmission control lever in this slow position SL causes the transmission control cable (see FIGS. 1, 1A, and 3A) to rotate the transmission T about the axis of the axle shaft toward the motor thereby loosening the tension in endless member EM. The downward force of bias element 40 against first pulley member $TP_1$ combined with the reduction in tension of endless member EM forces endless member EM outward until endless member EM is under tension again. In the slow position SL, the position of the transmission T shortens the distance between variable pitch pulley TP and drive pulley MP (see FIG. 3A) to allow the force of the biasing element to cause first pulley member $TP_1$ to abut second pulley member $TP_2$, while still creating enough friction between contact surfaces $BS_1$ and $BS_2$ of endless member EM and respective contact surfaces $CS_1$ and $CS_2$ to rotate the input shaft. At such a position, variable pitch pulley has its greatest effective pitch diameter $d_3$ as measured from the inner surface of the endless member EM.

In FIG. 4B, transmission control lever TCL is set at an intermediate position MI. The transmission control lever in this intermediate position MI causes the transmission control cable (see FIGS. 1 and 1A) to rotate the transmission T about the axis of the axle shaft tightening the tension in endless member EM as compared to slow position SL in FIG. 4A. The angled contact surfaces $BS_1$ and $BS_2$ of endless member EM push against the angled contact surfaces $CS_1$ and $CS_2$ of the first and second pulley members $TP_1$ and $TP_2$ with the increased tension in endless member EM caused by increasing the distance between variable pitch pulley TP and drive pulley MP. At such an intermediate position, variable pitch pulley TP has a shortened pitch diameter $d_4$.

In FIG. 4C, transmission control lever TCL is set at a fast position FA. The transmission control lever in this fast position FA causes the transmission control cable (see FIGS. 1, 1A, and 2) to rotate the transmission T about the axis of the axle shaft further tightening the tension in endless member EM as compared to slow position SL in FIG. 4A or intermediate position MI. The angled contact surfaces $BS_1$ and $BS_2$ of endless member EM push against the angled contact surfaces $CS_1$ and $CS_2$ of the first and second pulley members $TP_1$ and $TP_2$ with the increased tension in the endless member caused by increasing the distance between variable pitch pulley TP and drive pulley MP. At such a fast position, variable pitch pulley TP has its smallest pitch diameter $d_5$. Pitch diameter $d_6$ permits a faster rotation of input shaft IS as explained above.

In the embodiment shown in FIGS. 4A-4C, the transmission T with its transmission control lever TCL can provide one or more fixed speed settings between slow position SL and fast position FA. However, as is described below, the transmission T can be a continuous variable transmission.

Figure 5A:
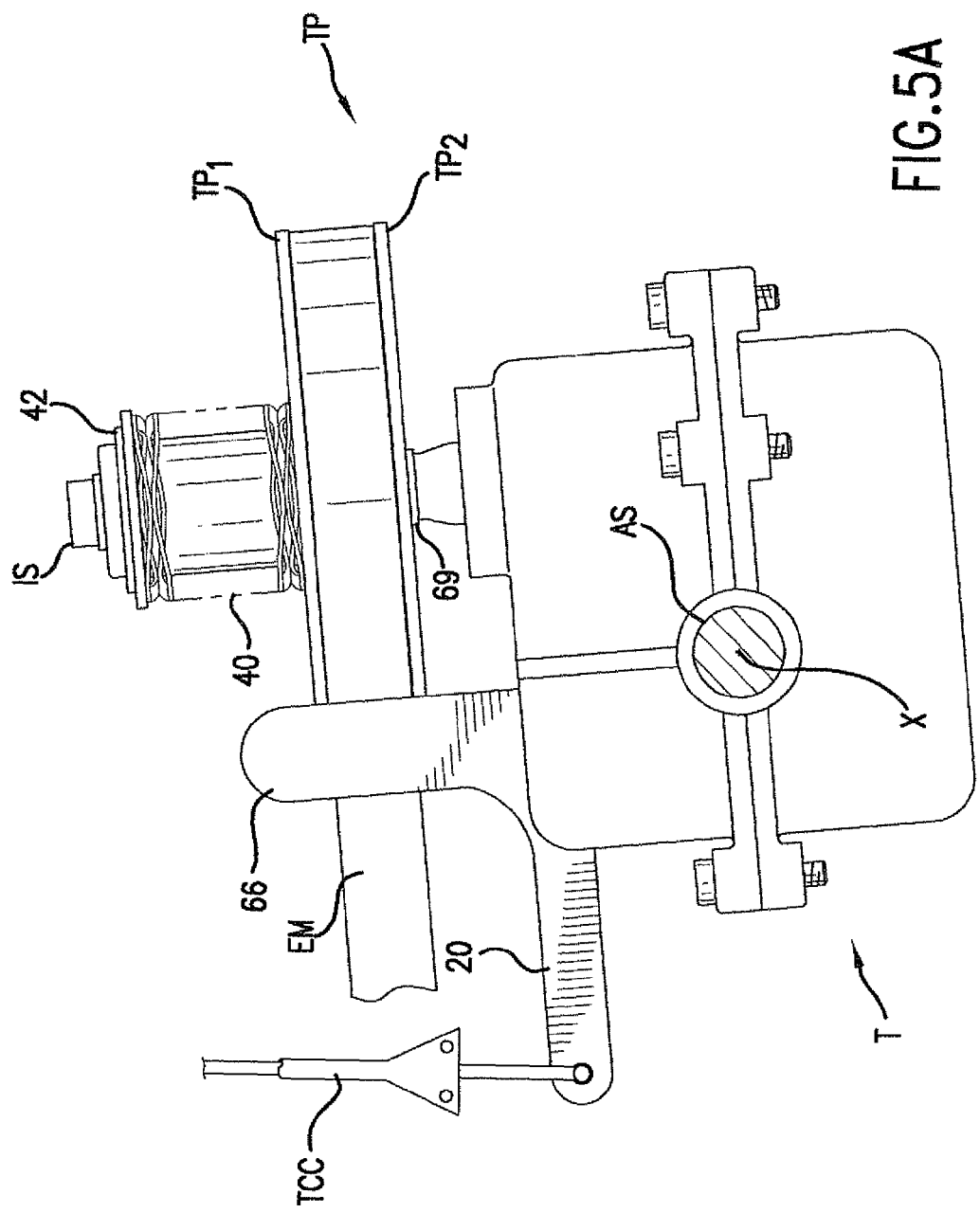

FIGS. 5A-5C illustrate side views of a transmission T at different rotations about axis of axle shaft AS at different positions. As the transmission control lever TCL and/or operational control lever OCL are moved into different positions, transmission control cable TCC rotates transmission T to corresponding positions about the axis of axle shaft AS to change the speed or state of the drive system DS (see FIGS. 1A, 2, 3A and 3B). The positions of the transmission T can include a disengaged position where the distance between the variable pitch pulley TP and the drive pulley creates a reduction in tension in endless member EM to a point where first and second pulley members $TP_1$ and $TP_2$ abut one another and further compensation by change in pitch diameter to create tension in endless member EM is needed, but cannot occur. At this point, endless member EM is in a relaxed state and cannot create enough friction with the pulleys to transfer rotate to variable pitch pulley TP.

In FIGS. 5A-5C, the transmission control lever is connected to transmission T that is rotatable about axle shaft AS of the self-propelled machine by transmission control cable TCC. Transmission control cable TCC can be secured to a pivot arm 20 through a locking engagement 20A that permits transmission control cable TCC to rotate transmission T in either direction about axis X of axle shaft AS. Transmission T can include an input shaft IS that can extend in a perpendicular plane to axle shaft AS of the self-propelled machine. The input shaft IS drivingly engages axle shaft AS so that as input shaft IS is turned about its axis, transmission T turns axle shaft AS and thereby the rear wheels of the self-propelled machine. Transmission T further can include variable pitch pulley TP that can comprise aligned first and second pulley members $TP_1$ and $TP_2$ positioned axially about input shaft IS with first pulley member $TP_1$ of variable pitch pulley TP being movable axially along input shaft IS. A bias element 40, such as a spring, can bias first pulley member $TP_1$ toward second pulley member $TP_2$ of variable pitch pulley TP. A retaining ring 42 can be secured around input shaft IS to secure bias element 40 to transmission T. Bias element 40 can be placed between retaining ring 42 and first pulley member $TP_1$. Guide members 46 positioned proximate to variable pitch pulley TP and endless member EM can rotate with transmission T and prevent endless member EM from becoming misaligned or removed from variable pitch pulley TP. Transmission T and input shaft IS can rotate in the plane perpendicular to that of axis X of axle shaft AS about axis X. Transmission T and input shaft IS can rotate about axle shaft AS, while still converting a rotation of input shaft IS that is perpendicular to axle shaft AS to a rotation of axle shaft AS.

FIG. 5A shows input shaft IS in a disengaged position with endless member EM in a relaxed state. Transmission control cable TCC through transmission pivot arm 20 has rotated transmission T around central axis X of axle shaft AS so that the distance between variable pitch pulley TP and the drive pulley permits endless member EM to be relaxed or under such small amounts of tension that any friction between endless member EM and variable pitch pulley TP will not be enough to rotate variable pitch pulley TP and input shaft IS. Guide members such as guide member 66 shown in FIGS. 5A-5C prevent endless member EM from becoming misaligned or removed from variable pitch pulley TP when endless member EM is in such a relaxed state. In this disengaged position, the input shaft IS is rotated about the axle shaft until variable pitch pulley TP and the pulley shaft are not rotated by the endless member EM and the axle shaft is not driven by the pulley shaft the machine. In the position of transmission T shown in FIG. 5A, input shaft IS is not in parallel alignment with the drive shaft of the motor, but is slightly tilted toward the motor. Thus, variable pitch pulley TP is slightly skewed as compared to the drive pulley around which endless member EM runs. In such a configuration, the self-propelled machine is not propelled by its drive system.

Referring to FIG. 5B, transmission control cable TCC through transmission pivot arm 20 has rotated transmission T around axis X of axle shaft AS so that the distance between variable pitch pulley TP and the drive pulley puts endless member EM under tension to create frictional engagement of variable pitch pulley TP to turn variable pitch pulley TP and input shaft IS. As shown in FIG. 4A, the pitch diameter of variable pitch pulley TP when the transmission T is in a slow position as shown in FIG. 5B is larger than when transmission T is in a fast position. Thus, since the drive pulley is a constant diameter when motor runs at the same speed, variable pitch pulley TP and input shaft IS rotate at a slower speed than when transmission T is in a fast position. Thus, the self-propelled machine that employs transmission T is propelled at a slower speed.

Referring to FIG. 5C, as transmission control cable TCC through transmission pivot arm 20 has rotated transmission T from a slow position to a fast position, transmission T and input shaft IS rotate around axis X of axle shaft AS so that variable pitch pulley TP moves farther from the drive pulley. This rotational movement creates tension in endless member EM that overcomes the forces of the bias element 40 such that first and second pulley members $TP_1$ and $TP_2$ of the variable pitch pulley are separated. The separation creates a smaller pitch diameter, thereby increasing the speed at which endless member EM turns variable pitch pulley TP and input shaft IS. In the embodiment shown, input shaft IS is rotated away from the drive shaft so as to not be in parallel alignment with the drive shaft of the motor. Instead, input shaft IS is slightly tilted away from the motor. The pitch diameter of variable pitch pulley TP when the transmission T is in a fast position as shown in FIG. 5C is smaller than when transmission T is in a slow position as shown in FIG. 5B. Thus, since the drive pulley is a constant diameter when motor runs at the same speed, variable pitch pulley TP and input shaft IS rotate at a faster speed than when transmission T is in a slow position. Thus, the self-propelled machine that employs transmission T is propelled at a faster speed by transmission T.

As transmission control cable TCC moves transmission T from the fast position of FIG. 5C to the slow position of FIG. 5B, transmission T and its input shaft IS rotate about axis X of axle shaft AS such that variable pitch pulley TP moves towards the drive pulley. This rotational movement decreases tension in endless member EM, and the bias element 40 pushes first pulley member $TP_1$ toward second pulley member $TP_2$ of variable pitch pulley TP. Tension in endless member EM is increased and equilibrium between the forces of the bias element 40 and the tension in endless member EM is restored. The decreased separation of first and second pulley members $TP_1$ and $TP_2$ of variable pitch pulley TP creates a larger pitch diameter, thereby decreasing the speed again.

The embodiments disclosed herein are not limited to any particular configuration of transmission T or the torque transfer mechanism as long as it permits rotation of an input shaft about an axis of an output shaft to which it engages and the input shaft extends at least transverse to the output shaft. Transmission T is a variable-speed transmission and can be a continuously variable-speed transmission. As appreciated by persons skilled in the art, by providing an appropriate control mechanism, an operator can control the output speed of a continuously variable-speed transmission, and thus the speed of driving wheel(s) $W_D$, over a continuous or substantially continuous range between a minimum low speed (which can be zero) and a maximum high speed. Generally, for the embodiments disclosed herein, the variation/adjustment of torque and/or transmission speed can be accomplished through the axial translation of one or more components of the torque transfer mechanism and/or transmission T, one example being first pulley member $TP_1$ of transmission pulley TP as described above. A continuously variable-speed transmission can be implemented at least in part through the use of variable-pitch transmission pulley TP or other suitable torque/angular speed varying means. An example of a suitable continuously variable-speed transmission that includes transmission pulley TP is described below with reference to FIGS. 6, 7, 8, 9A-9C, and 10.

Referring to FIGS. 6A, 6B, 7, 8 and 9A-9C, an embodiment of a variable speed transmission T is provided. Variable speed transmission T can include transmission housing TH comprising two halves, 50 and 52, which are fastened together by a plurality of bolts 54 at interface 56. An output shaft in the form of axle shaft AS has an axis of rotation X and is rotatably supported within housing TH by a pair of roller bearings provided, respectively, in sleeve assemblies 58 and 60 (see FIGS. 7 and 8), which are fixed between housing halves 50 and 52.

A pivot arm 62 can be integrally attached to housing half 50 and can extend vertically relative to housing half 14. The placement of pivot arm 62 can be anywhere on transmission housing TH as long as it does not interfere with operation of transmission T or the turning of an endless member such as a belt or chain. For example, pivot arm 62 can be on either side of housing half 50. Further, pivot arm 62 could be attached to the lower housing half 52. A through hole 64 can be formed in pivot arm 62, and can receive transmission control cable TCC which can be secured therein to allow transmission control cable TCC to rotate transmission T about axis X of axle shaft AS. Transmission control cable TCC can also stabilize the position of transmission T after rotation to permit stable operation of the transmission T to propel the machine in which it is used. Pivot arm 62 can include a guide member 66 that can prevent an endless member that is used to turn variable pitch pulley TP from becoming misaligned or removed from variable pitch pulley TP when little or no tension exists in the endless member. A second guide member 66 can extend from a portion of housing half 50 on the other side of the variable pitch pulley TP.

Engagement and disengagement of transmission T can be exercised selectively through operator control of transmission control cable TCC linked to pivot arm 62 described above.

Figure 6A:
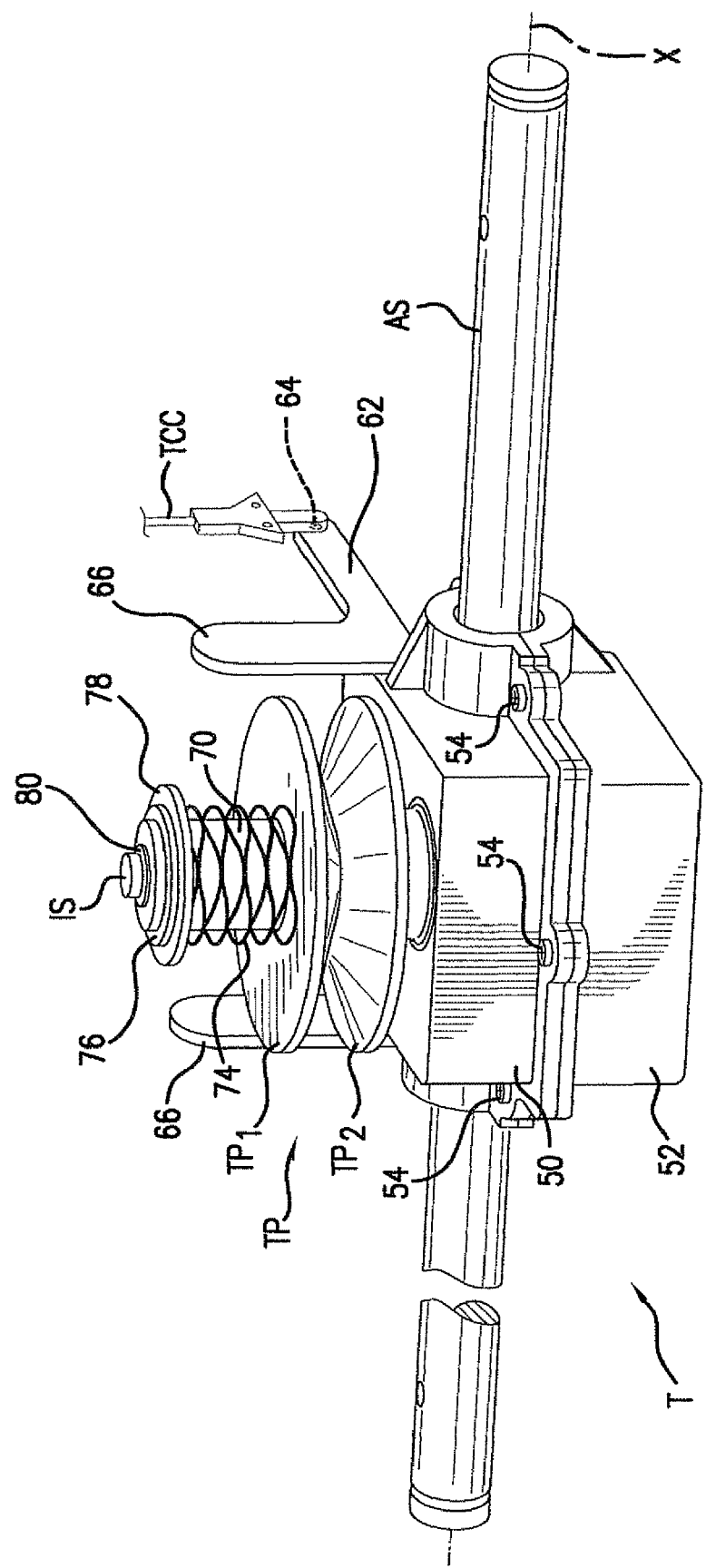
FIG. 6A illustrates a top-side perspective view of an embodiment of a transmission according to the present subject matter.
Figure 6B:
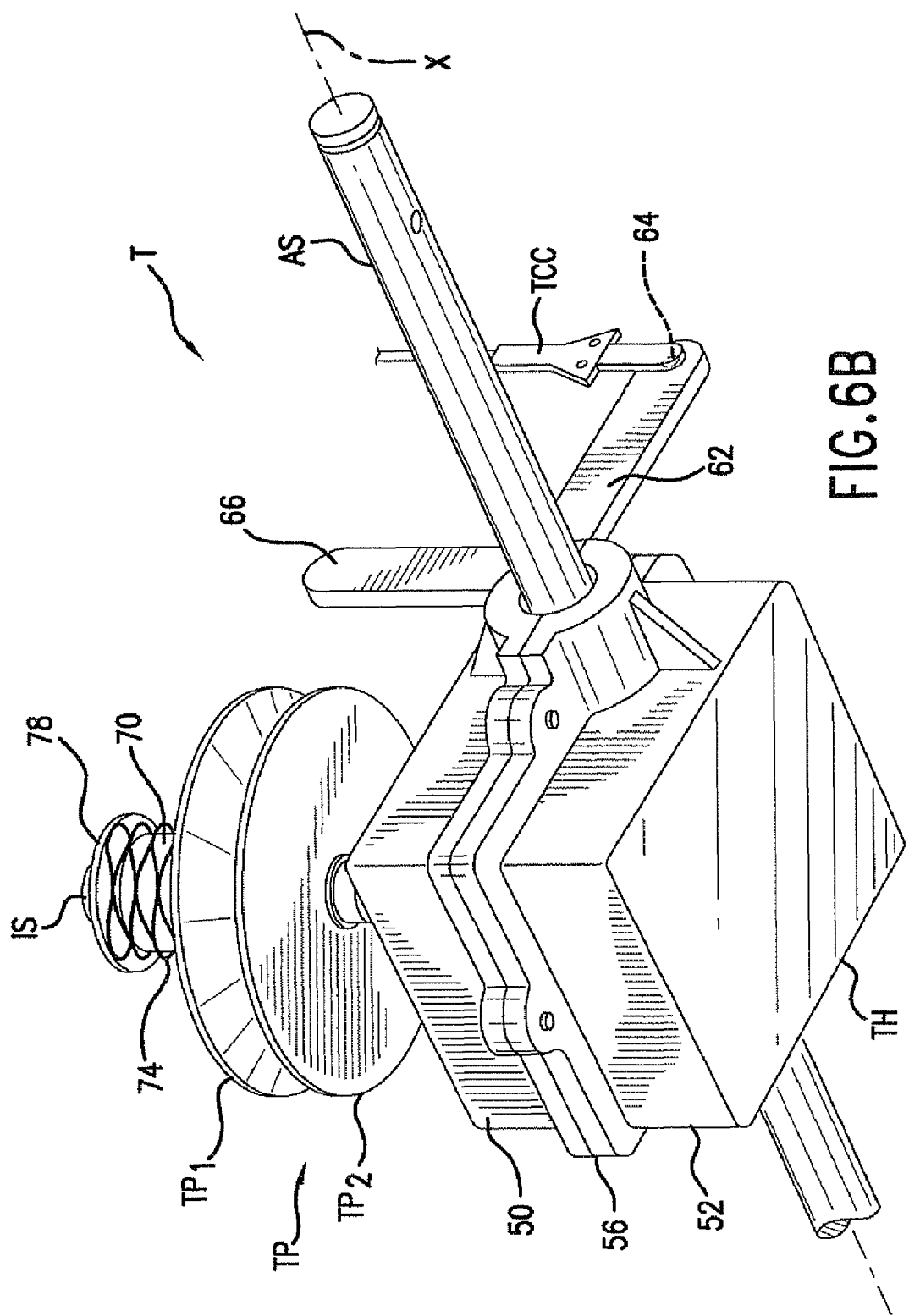
FIG. 6B illustrates a top-side perspective view of the embodiment of a transmission according to FIG. 6A.
Figure 7:
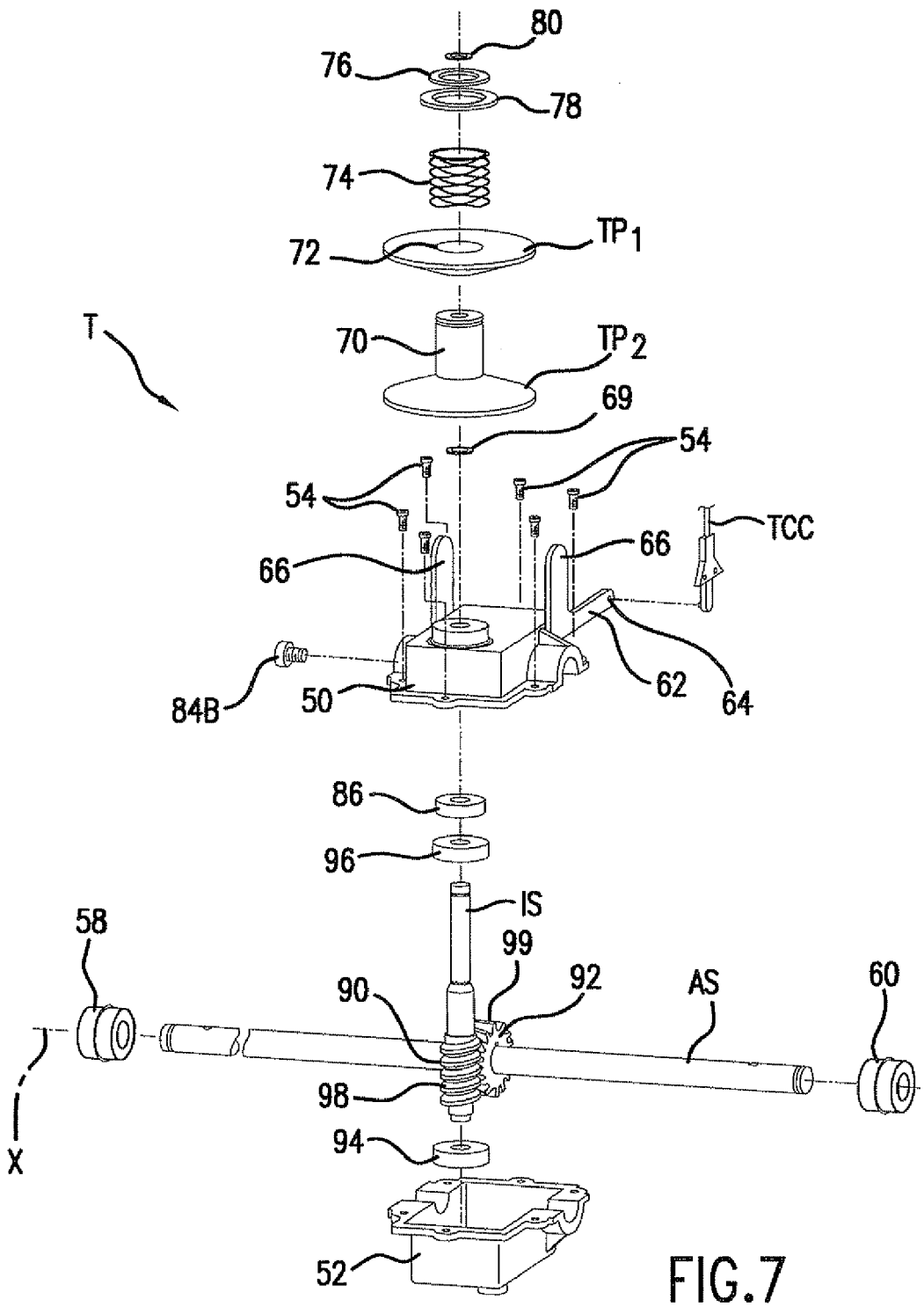
FIG. 7 illustrates an exploded view of the portion of the transmission of FIGS. 6A and 6B.

Variable pitch pulley TP can be externally positioned relative to housing TH of transmission T and can be engaged by an endless member, such as a drive belt. Variable pitch pulley TP is rotatable about an axis Y. Variable pitch pulley TP can include first and second pulley members $TP_1$ and $TP_2$. Second pulley member $TP_2$ can be rotatably supported upon retaining ring 69 (FIGS. 6A and 7). Retaining ring 69 can be engaged within a circumferentially formed groove provided in input shaft IS. Second pulley member $TP_2$ can be integrally attached to a first end of a hub 70 (FIGS. 6 and 7) and a second end of hub 70 can slidably extend through an aperture 72 (FIG. 7) of first pulley member $TP_1$. Hub 70 can have a cross-sectional shape that facilitates rotation of first pulley member $TP_1$ with second pulley member $TP_2$ and hub 70. For example, hub 70 can have a hexagonally shaped cross-sectional that matingly engages a hexagonally shaped aperture 72. Hub 70 and aperture 72 can have other matching cross-sectional shapes such a square, rectangle, octagon, oval, non-symmetrical shape, or the like. Alternatively, other locking features such as matching splines or key and keyway can be used to permit sliding engage of hub 70 with first pulley member $TP_1$ while encouraging rotation of first pulley member $TP_1$ with hub 70.

Figure 9A:
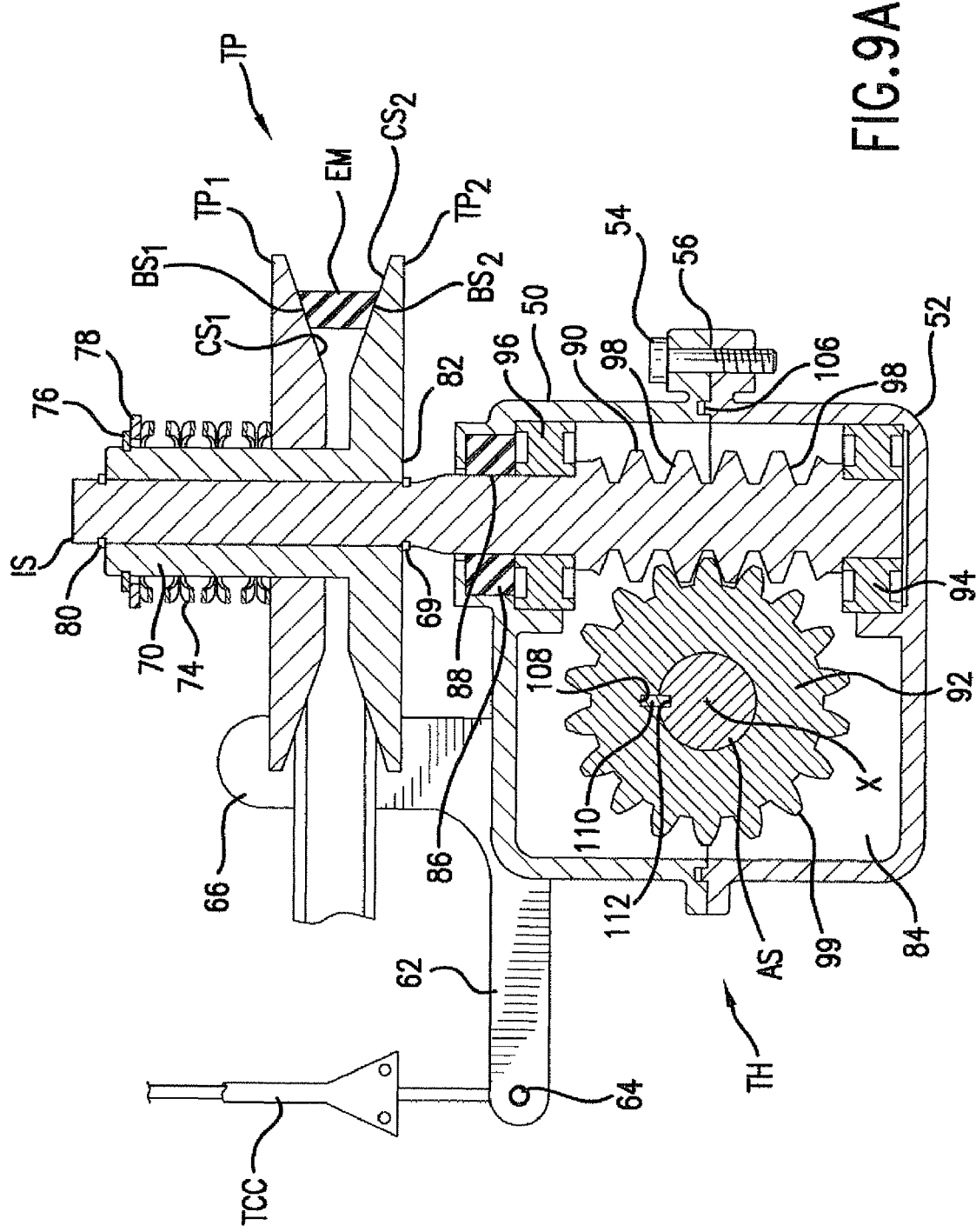
Figure 9B:
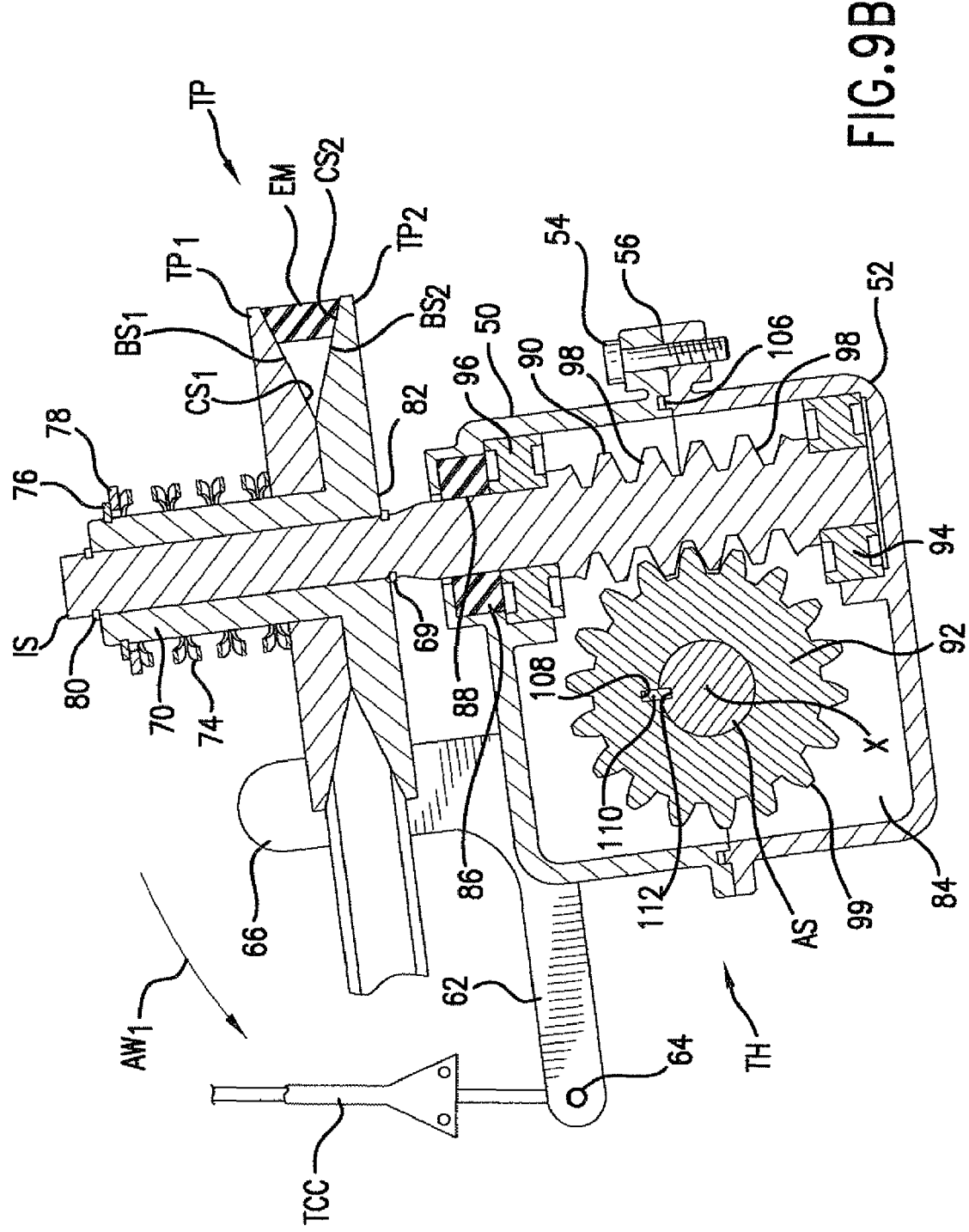

As best seen in FIGS. 7 and 9A-9C, a bias element 74, such as a compression spring, can be positioned between first pulley member $TP_1$ and retaining ring 76 to impart a continuous axial force upon first pulley member $TP_1$. This axial force is transferred to endless member EM to maintain continuous operative engagement between variable pitch pulley TP and endless member EM (FIGS. 9A-9C). Retaining ring 76 can be engaged within a circumferential groove provided in hub 70, and thrust washer 78 is positioned between bias element 74 and retaining ring 76. Second retaining ring 80 can be received in a circumferential groove provided in input shaft IS and can abut an axial end of hub portion 82 to retain second pulley member $TP_2$ and hub 70 relative to input shaft IS.

Figure 8:
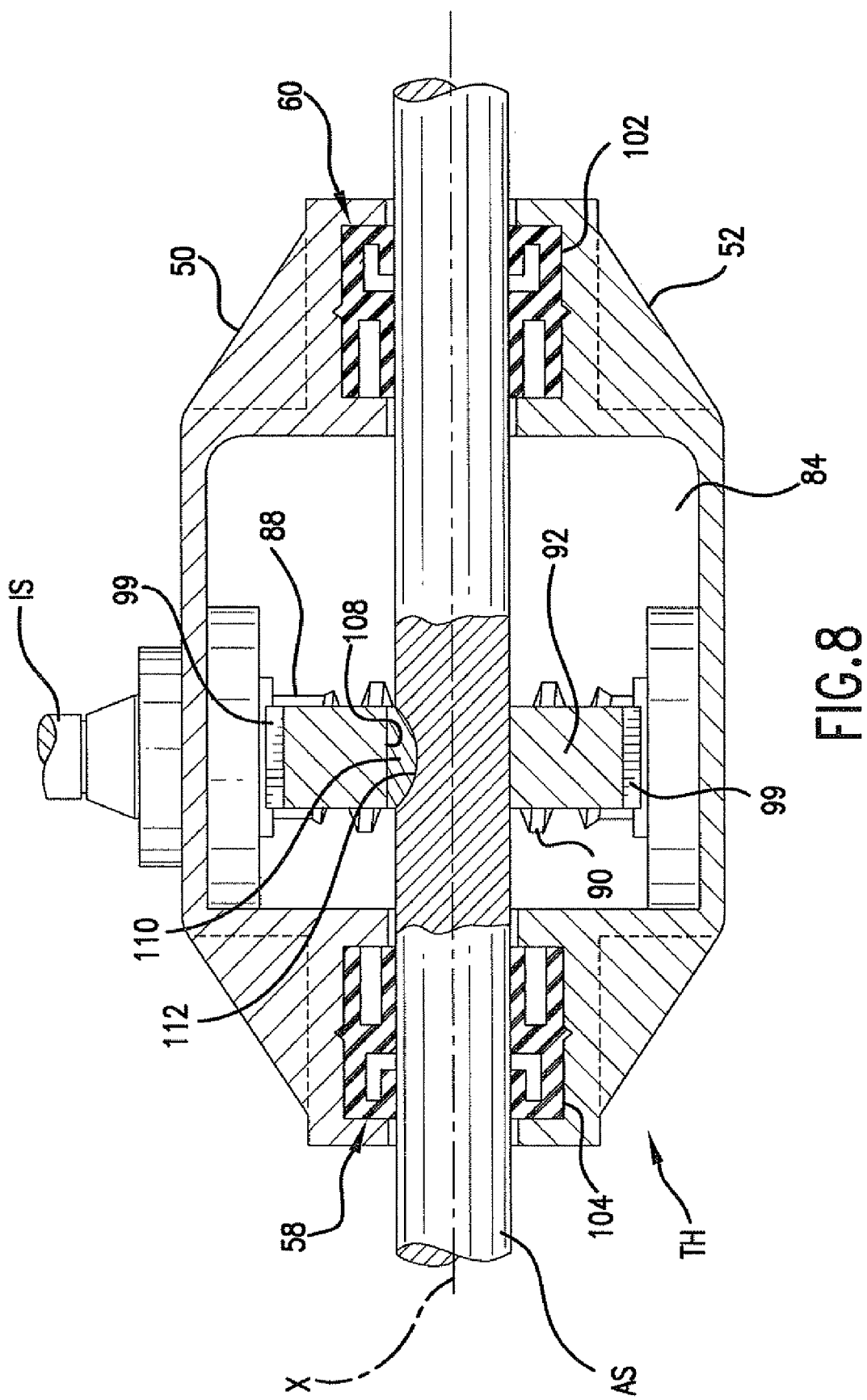
FIG. 8 illustrates a vertical cross-sectional view of the transmission of FIG. 6A parallel to the axis of the axle shaft.

Referring to FIGS. 8 and 9A-9C, housing TH of transmission T can include sealed internal cavity 84, provided with lubrication oil. Shaft seal 86 can be captured within a recessed portion of housing half 50 to seal surface 88 of input shaft IS and enclose lubrication oil provided in cavity 84 of housing TH (see FIGS. 9A-9C). Referring to FIG. 8, a pair of seals 102 and 104 provides a lubrication barrier between axle shaft AS and housing TH and can be included in each respective sleeve assembly 58 and 60 to prevent oil within cavity 84 from escaping housing TH. Housing seal 106 can be provided between housing halves 50 and 52 to seal housing cavity 84 at interface 56 (see FIGS. 9A-9C). Oil fill plug 84B can be removably attached to housing TH to allow for introduction or removal of oil (see FIG. 7).

Referring to FIGS. 7 and 9A-9C, input shaft IS can include worm portion 90 located on outer surface 88 thereof, and intermeshed with a gear 92 on axle shaft AS. Gear 92 can be a spur gear. A pair of ball bearing assemblies 94 and 96 can be respectively fitted within respective housing halves 50 and 52 to rotatably support input shaft IS. In the embodiment shown, gear 92 can be rotatably secured to axle shaft AS by a key 110 placed in keyways 108 and 112 defined in gear 92 and axle shaft AS, respectively. In other embodiments, gear 92 may be clutched. For example, gear 92 can be clutched in a similar manner as the torque transfer mechanism described in U.S. application Ser. No. 10/909,113, the disclosure of which is incorporated herein by reference. The worm portion 90 can have one or more threads 98 defined around input shaft IS that intermesh with teeth 99 of spur gear 92 to turn axle shaft AS.

Referring to FIGS. 9A-9C and 10, the rotation of input shaft IS about axis X of axle shaft AS is described. Due to the angle of contact surfaces $CS_1$ and $CS_2$ of first and second pulley members $TP_1$ and $TP_2$, respectively, and the angle of the contact surfaces $BS_1$ and $BS_2$ of the endless member EM, the angle of rotation between a disengage position of input shaft IS and a fast position of input shaft IS can be small. Therefore, with proper selection of gears, the gear 92 can be rotatably secured to axle shaft AS and input shaft IS can stay engaged with gear 92 even during rotation of input shaft IS about axis X of axle shaft AS. Such an embodiment is described below merely as an example of a possible torque transfer arrangement. However, as mentioned above, other arrangement can be used that are within the capabilities of one of ordinary skill in the art. For example, some embodiments may clutch the gear disposed on the axle shaft or may engage and disengage the input shaft to permit rotation of the input shaft about the axle shaft. It is respectfully submitted that such variations are within the scope of the present subject matter.

As stated above, gear 92 can be a spur gear that engages thread 98 of worm portion 90 of input shaft IS. The lead angle of thread 98 is great enough in the embodiment shown that worm portion 90 of input shaft IS can rotate gear 92 when input shaft IS is driven by endless member EM and that, as necessary, gear 92 can turn input shaft IS when variable pitch pulley TP on input shaft IS is disengaged from endless member EM. In this manner, gear 92 can still rotate with axle shaft AS and also stay engaged with input shaft IS even when the drive system is not being engaged.

Figure 10:
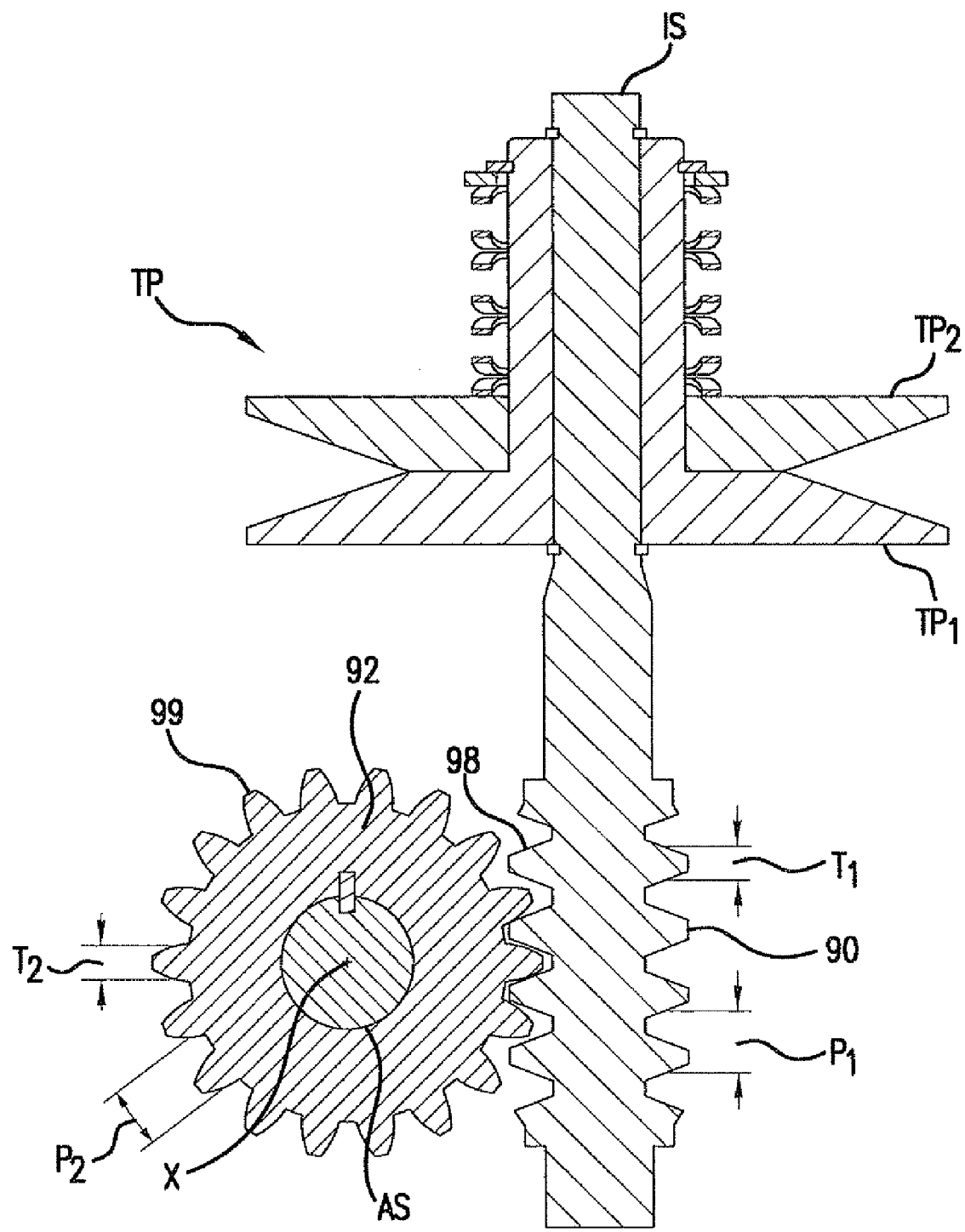
FIG. 10 illustrates a vertical cross-sectional view of the drive gearing of the transmission of FIG. 6A perpendicular to the axis of the axle shaft.

As shown in FIG. 10, thread 98 of worm portion 90 of input shaft IS can have a thread thickness $T_1$ and a linear pitch $P_1$. Gear 92 has a tooth thickness $T_2$ for each of teeth 99 and a pitch $P_2$. Linear pitch $P_1$ of thread 98 of worm portion 90 of input shaft IS can match pitch $P_2$ of gear 92 to permit continuous use of the gearing together. Further, thread thickness $T_1$ of thread 98 and tooth thickness $T_2$ of teeth 99 of gear 92 can be small enough and linear pitch $P_1$ of thread 98 and pitch $P_2$ of gear 92 can be great enough to allow enough play within the gearing while still transferring torque to allow input shaft IS to rotate enough about axis X of axle shaft AS to provide a range of drive speeds (including a disengaged position) at which to turn the drive wheels of the self-propelled machine. Gear 92 and input shaft IS can be constructed to be sturdy enough to withstand the stress created by the play in the gearing and the torque created by the drive system.

FIGS. 9A-9C illustrate an exaggerated rotation of transmission T and input shaft IS about axle shaft AS. FIG. 9A shows transmission T in an intermediate position where the tension in endless member EM can overcome the forces of bias element 74 to separate first and second pulley members $TP_1$ and $TP_2$ and can create a pitch diameter that rotates input shaft IS at a medium speed. Gear 92 can be secured to axle shaft AS so that as gear 92 rotates, axle shaft AS rotates and vice versa. Teeth 99 of gear 92 can engage thread 98 of worm portion 90 of input shaft IS such that thread 98 can rotate gear 92 through teeth 99. At the same time, the teeth 99 and thread 98 can have enough space between them due to the pitch and the thread and tooth thickness of the respective gearing to permit a small rotation of input shaft IS about axis X of axle shaft AS.

FIG. 9B show transmission T in a slow position where the tension in endless member EM is reduced such that the forces of bias element 74 push first and second pulley members $TP_1$ and $TP_2$ closer together and create a pitch diameter that rotates input shaft IS at a slow speed. Input shaft IS rotates about axis X of axle shaft AS in a direction $A_1$ when the transmission T is being moved from an intermediate or fast position. The spacing of teeth 99 and thread 98 due to the pitch and the thread and tooth thickness of the respective gearing permit this small rotation of input shaft IS about axis X of axle shaft AS in direction $A_1$.

FIG. 9C shows transmission T in a fast position. In the fast position, the tension in endless member EM is increased such that the forces of bias element 74 are overcome and endless member EM pushes first and second pulley members $TP_1$ and $TP_2$ farther apart and create a pitch diameter that rotates input shaft IS at a fast speed. Input shaft IS rotates about axis X of axle shaft AS in a direction $A_2$ when the transmission T is being moved from the slow or an intermediate position. The spacing of teeth 99 and thread 98 due to the pitch and the thread and tooth thickness of the respective gearing permit this small rotation of input shaft IS about axis X of axle shaft AS in direction $A_2$.

Abutments may be placed in proximity to transmission T to limit the amount of rotation of transmission T around axle shaft AS. Further, friction engagements can be provided to aid in holding transmission T in a slow, intermediate, or fast position. It is respectfully submitted that such variations are within the scope of the present subject matter.

Embodiments of the present disclosure shown in the drawings and described above are exemplary of numerous embodiments that can be made within the scope of the appending claims. It is contemplated that the configurations of the transmissions and drive systems and relate methods can comprise numerous configurations other than those specifically disclosed. The scope of a patent issuing from this disclosure will be defined by these appending claims.

What is claimed is:

1. A transmission for a self-propelled machine, the transmission comprising:
    an output shaft comprising a gear fixedly secured to the output shaft to rotate with the output shaft such that the gear rotates the output shaft as the gear is rotated;
    an input shaft having an axis and extending substantially transverse to the output shaft, the input shaft comprising a gear and being rotatable about the axis of the input shaft and the gear of the input shaft configured to drivingly engage the gear of the output shaft to rotate the output shaft when the input shaft is rotated;
    a variable pitch pulley disposed axially on the input shaft and configured to rotate about the axis of the input shaft, the variable pitch pulley being configured to change pitch diameter to regulate the speed at which the input shaft is rotated about the axis of the input shaft; and
    the input shaft being at least partially rotatable about an axis of the output shaft to vary the pitch of the variable pitch pulley to regulate the speed at which the input shaft drives the output shaft.

2. The transmission according to claim 1, wherein the variable pitch pulley comprises a first pulley member and a second pulley member which are rotatable about the axis of the input shaft, at least the first pulley member being axially movable relative to the second pulley member.

3. The transmission according to claim 1, further comprising a drive shaft having a drive shaft axis and being rotatable by a motor about the drive shaft axis, and a drive pulley disposed on the drive shaft and in communication with the variable pitch pulley with the drive pulley and configured for transferring rotation from the drive shaft rotated by the motor to the variable pitch pulley to rotate the input shaft.

4. The transmission according to claim 3, further comprising an endless member configured to be positioned about the drive pulley and the variable pitch pulley with the endless member transferring power from the drive pulley to the variable pitch pulley.

5. The transmission according to claim 4, further comprising at least one guide member that prevents the endless member from becoming misaligned with the variable pitch pulley, the at least one guide member being movable with the input shaft when the input shaft rotates about the axis of the output shaft.

6. The transmission according to claim 4, further comprising;
a housing in which the gear of the input shaft and the gear of the output shaft reside, the housing rotatable about the axis of the output shaft with the input shaft;
a pivot arm secured to the housing to facilitate rotation of the housing and the input shaft about the output shaft;
a cable attached to the pivot arm for controlling the rotation of the housing and the input shaft about the axis of the output shaft and a lever for controlling the movement of the cable; and
a first guide member attached to the pivot arm that prevents the endless member from becoming misaligned with the variable pitch pulley, the first guide member being movable with the pivot arm.

7. The transmission according to claim 6, further comprising a second guide member secured to the housing on an opposite side of the variable pitch pulley than the first guide member, the second guide member being movable with the housing and preventing the endless member from becoming misaligned with the variable pitch pulley.

8. The transmission according to claim 1, further comprising a cable for controlling the rotation of the input shaft about the axis of the output shaft and a lever for controlling the movement of the cable.

9. The transmission according to claim 1, wherein the input shaft is rotatable about the output shaft between a position wherein the input shaft is not rotated and the output shaft is not driven by the input shaft, and a maximum drive position at which the variable pitch pulley rotates the input shaft to drive the output shaft at a maximum speed.

10. The transmission according to claim 9, wherein one or more fixed speed settings is set between the position of the input shaft where the output shaft is not rotated by the input shaft and the maximum drive position where the output shaft is rotated at a maximum speed.

11. The transmission according to claim 1, wherein the gear of the output shaft is locked to the output shaft by a key.

12. A drive system comprising:
a drive shaft having a drive shaft axis and being rotatable by a motor about the drive shaft axis;
an axle shaft comprising a gear fixedly secured to the axle shaft to rotate with the axle shaft such that the gear rotates the axle shaft as the gear is rotated;
an input shaft having an axis and extending transverse to the axle shaft of a self-propelled machine, the input shaft comprising a gear and being rotatable about the axis of the input shaft and the gear of the input shaft configured to drivingly engage the gear of the axle shaft to rotate the axle shaft when the input shaft is rotated;
a variable pitch pulley disposed axially on the input shaft and configured to rotate about the axis of the input shaft, the variable pitch pulley being configured to change pitch diameter to regulate the speed at which the input shaft is rotated;
a drive pulley disposed on the drive shaft and in communication with the variable pitch pulley with the drive pulley configured for transferring rotation from the drive shaft rotated by the motor to the variable pitch pulley to rotate the input shaft;
an endless member configured to be positioned about the drive pulley and the variable pitch pulley where the endless member can transfer power from the drive pulley to the variable pitch pulley; and
a control mechanism for controlling rotation of the input shaft about an axis of the axle shaft to vary pitch of the variable pitch pulley to regulate the speed at which the input shaft drives the axle shaft.

13. The drive system according to claim 12, wherein the input shaft is rotatable about the axle shaft between a position wherein the input shaft is not rotated and the axle shaft is not driven by the input shaft and a maximum drive position at which the variable pitch pulley rotates the input shaft to drive the axle shaft at a maximum speed.

14. The drive system according to claim 13, wherein one or more fixed speed settings is set between the position of the input shaft where the axle shaft is not rotated by the input shaft and the maximum drive position where the axle shaft is rotated at a maximum speed.

15. The drive system according to claim 12, wherein the control mechanism comprises a cable and a lever in operable communication with the cable to control movement of the cable.

16. The drive system according to claim 12, wherein the variable pitch pulley comprises a first pulley member and a second pulley member which are rotatable about the axis of the input shaft, at least the first pulley member being axially movable relative to the second pulley member.

17. The drive system according to claim 16, further comprising a biasing element that biases the first pulley member towards the second pulley member of the variable pitch pulley.

18. A method for driving a self-propelled machine, the method comprising:
providing an output shaft comprising a gear fixedly secured to the output shaft to rotate with the output shaft such that the gear of the output shaft rotates the output shaft as the gear is rotated and an input shaft having an axis and extending substantially transverse to the output shaft, the input shaft comprising a gear and being rotatable about the axis of the input shaft, the input shaft having a variable pitch pulley disposed axially thereon;
drivingly engaging the gear secured to the output shaft of a self-propelled machine with the gear of the input shaft;
engaging the variable pitch pulley with an endless member;
rotating the variable pitch pulley with the endless member to rotate the input shaft about the axis of the input shaft and drive the output shaft with the input shaft; and
rotating the input shaft about the axis of the output shaft to vary a pitch diameter of the variable pitch pulley to adjust a speed at which the output shaft is driven.

19. The method according to claim 18, wherein the variable pitch pulley comprises a first pulley member and a second pulley member which are rotatable about the axis of the input shaft, at least the first pulley member being axially movable relative to the second pulley member and further comprising biasing the first pulley member towards the second pulley member of the variable pitch pulley.

20. The method according to claim 19, further comprising driving the endless member with a drive pulley attached to a drive shaft of a motor.

21. The method according to claim 20, further comprising rotating a cutting element of the self-propelled machine with the drive shaft.

22. The method according to claim 20, further comprising facilitating alignment of the endless member with the variable pitch pulley and the drive pulley with at least one guide member.

23. The method according to claim 19, wherein the step of rotating the input shaft further comprises rotating the input shaft between a position wherein the endless member belt drive is not rotated and the output shaft is not driven by the input shaft and a maximum drive position wherein the endless member is fully tensioned and the variable pitch pulley rotates the input shaft to drive the output shaft at a maximum speed.

24. The method according to claim 23, wherein the step of rotating the input shaft further comprises rotating the input shaft to one or more fixed speed settings between the position of the input shaft where the output shaft is not rotated by the input shaft and the maximum drive position where the output shaft is rotated at a maximum speed.

25. A method for driving a self-propelled machine, the method comprising:
   providing an axle shaft having an axis and comprising a gear fixedly secured to the axle shaft to rotate with the output shaft such that the gear of the axle shaft rotates the axle shaft as the gear is rotated and an input shaft having an axis that extends transverse to the axis of the axle shaft, the input shaft comprising a gear and having a variable pitch pulley disposed axially thereon;
   engaging the gear secured to the axle shaft of a self-propelled machine with the gear of the input shaft;
   engaging the variable pitch pulley with an endless member;
   driving the endless member with a drive pulley attached to a drive shaft of a motor;
   rotating the variable pitch pulley with the endless member to rotate the input shaft about the axis of the input shaft and drive the axle shaft with the input shaft; and
   rotating the input shaft about the axis of the axle shaft to adjust the speed of rotation of the axle shaft among at least a position wherein the endless member is not rotated and the axle shaft is not driven by the input shaft and a maximum drive position wherein the endless member is fully tensioned and the variable pitch pulley rotates the input shaft to drive the axle shaft at a maximum speed.

26. The method according to claim 25, wherein the step of rotating the input shaft further comprises rotating the input shaft to one or more fixed speed settings between the position of the input shaft where the axle shaft is not rotated by the input shaft and the maximum drive position where the axle shaft is rotated at a maximum speed.

27. The method according to claim 25, further comprising using at least one guide member to align the endless member.

28. The method according to claim 25, wherein the variable pitch pulley comprises a first pulley member and a second pulley member which are rotatable about the axis of the input shaft, at least the first pulley member being axially movable relative to the second pulley member and further comprising biasing the first pulley member towards the second pulley member of the variable pitch pulley.

* * * * *